United States Patent
Guner

(10) Patent No.: US 11,306,579 B2
(45) Date of Patent: Apr. 19, 2022

(54) MUD ANGLE DETERMINATION BY EQUALIZING THE RESPONSE OF BUTTONS FOR ELECTROMAGNETIC IMAGER TOOLS

(71) Applicant: HALLIBURTON ENERGY SERVICES, INC., Houston, TX (US)

(72) Inventor: Baris Guner, Houston, TX (US)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 83 days.

(21) Appl. No.: 16/863,003

(22) Filed: Apr. 30, 2020

(65) Prior Publication Data

US 2021/0340860 A1 Nov. 4, 2021

(51) Int. Cl.
*E21B 47/0228* (2012.01)
*E21B 47/002* (2012.01)
*G01V 3/12* (2006.01)

(52) U.S. Cl.
CPC ...... *E21B 47/0228* (2020.05); *E21B 47/0025* (2020.05); *G01V 3/12* (2013.01)

(58) Field of Classification Search
CPC .. E21B 47/024; E21B 47/0228; E21B 47/022; E21B 47/02; E21B 47/0025; E21B 47/002; G01V 3/12

(Continued)

(56) References Cited

U.S. PATENT DOCUMENTS 6,809,521 B2 * 10/2004 Tabarovsky ............. G01V 3/24
324/374
7,689,363 B2 * 3/2010 Itskovich ................. G01V 3/20
702/7

(Continued)

FOREIGN PATENT DOCUMENTS

AU 2008354330 A1 * 10/2009 ............... G01V 3/24
CA 1290843 C * 10/1991 ............... G01V 1/04

(Continued)

OTHER PUBLICATIONS

Paiaman et al., "Optimizing Wellbore Inclination and Azimuth to Minimize Instability Problems", Copyright—Oil and Gas Business, 2008. http://www.ogbus.ru/eng/ (Year: 2008).*

(Continued)

*Primary Examiner* — Patrick Assouad
*Assistant Examiner* — Sean Curtis
(74) *Attorney, Agent, or Firm* — Polsinelli PC

(57) ABSTRACT

Aspects of the subject technology relate to systems and methods for identifying a mud angle associated with an electromagnetic imager tool based on variations in mud effect removed quantities of tool measurements made by the electromagnetic imager tool. Tool measurements made through one or more measurement units of an electromagnetic imager tool can be received. The one or more measurement units can have azimuthal sensitivity and the electromagnetic imager tool can operate to log a wellbore in a formation in making the measurements. One or more mud effect removal techniques can be applied to the tool measurements across a plurality of mud angle estimates to generate mud effect removed quantities for the one or more measurement units across the plurality of mud angle estimates. A mud angle associated with the electromagnetic imager tool can be identified from the plurality of mud angle estimates based on an amount of variation between the mud effect removed quantities across the one or more measurement units for each of the plurality of mud angle estimates.

18 Claims, 11 Drawing Sheets

(58) Field of Classification Search
USPC .............................. 324/323–375; 702/6–13
See application file for complete search history.

(56) References Cited

U.S. PATENT DOCUMENTS

| | | | | |
|---|---|---|---|---|
| 8,305,083 | B2* | 11/2012 | Wang | G01V 3/24 324/369 |
| 8,330,466 | B2* | 12/2012 | Bloemenkamp | G01V 3/24 324/366 |
| 8,866,483 | B2* | 10/2014 | Bittar | G01V 3/24 324/374 |
| 8,901,932 | B2* | 12/2014 | Hayman | G01V 3/24 324/355 |
| 8,901,933 | B2* | 12/2014 | Hayman | G01V 3/24 324/355 |
| 8,933,700 | B2* | 1/2015 | Hayman | G01V 3/24 324/347 |
| 8,994,377 | B2* | 3/2015 | Hayman | E21B 47/085 324/356 |
| 9,556,678 | B2* | 1/2017 | Schaaf | E21B 4/02 |
| 9,651,704 | B2* | 5/2017 | Bloemenkamp | G01V 3/20 |
| 9,829,597 | B2* | 11/2017 | Zeroug | G01V 1/50 |
| 9,835,746 | B2* | 12/2017 | Yan | E21B 49/006 |
| 9,885,805 | B2* | 2/2018 | Hayman | G01V 13/00 |
| 10,012,749 | B2* | 7/2018 | Bose | E21B 47/005 |
| 10,301,877 | B2* | 5/2019 | Schaaf | E21B 7/068 |
| 10,358,905 | B2* | 7/2019 | Tello | G01V 1/50 |
| 10,895,113 | B2* | 1/2021 | Schaaf | E21B 7/068 |
| 11,060,397 | B2* | 7/2021 | Le | E21B 47/01 |
| 2003/0155925 | A1 | 8/2003 | Tabarovsky | G01V 3/24 324/374 |
| 2008/0288171 | A1* | 11/2008 | Itskovich | G01V 3/20 702/7 |
| 2010/0127709 | A1* | 5/2010 | Bloemenkamp | G01V 3/24 324/366 |
| 2011/0114309 | A1* | 5/2011 | Bloemenkamp | G01V 3/24 166/250.01 |
| 2011/0156710 | A1* | 6/2011 | Wang | G01V 13/00 324/366 |
| 2011/0199089 | A1* | 8/2011 | Hayman | G01V 3/24 324/347 |
| 2011/0199090 | A1* | 8/2011 | Hayman | G01V 3/20 324/356 |
| 2011/0204897 | A1* | 8/2011 | Hu | G01V 3/24 324/351 |
| 2011/0241689 | A1* | 10/2011 | Hayman | G01V 3/24 324/355 |
| 2011/0241690 | A1* | 10/2011 | Hayman | G01V 3/24 324/355 |
| 2013/0319764 | A1* | 12/2013 | Schaaf | E21B 7/06 175/24 |
| 2014/0184229 | A1* | 7/2014 | Bloemenkamp | G01V 3/20 324/369 |
| 2014/0347056 | A1* | 11/2014 | Hayman | G01V 13/00 324/355 |
| 2015/0185354 | A1* | 7/2015 | Hayman | G01V 3/24 324/355 |
| 2015/0355372 | A1* | 12/2015 | Bloemenkamp | G01V 13/00 702/7 |
| 2016/0109604 | A1* | 4/2016 | Zeroug | G01V 1/50 367/13 |
| 2016/0109605 | A1* | 4/2016 | Bose | E21B 47/005 367/35 |
| 2016/0209543 | A1* | 7/2016 | Valero | G01V 11/005 |
| 2017/0089142 | A1* | 3/2017 | Schaaf | E21B 4/02 |
| 2018/0203150 | A1* | 7/2018 | San Martin | G01V 3/20 |
| 2019/0257155 | A1* | 8/2019 | Schaaf | E21B 7/067 |
| 2019/0383131 | A1* | 12/2019 | Le | G01N 27/226 |
| 2020/0041683 | A1* | 2/2020 | Donderici | G01V 3/24 |
| 2020/0116884 | A1* | 4/2020 | Weng | G01V 1/305 |
| 2020/0256183 | A1* | 8/2020 | Guner | G01V 3/083 |
| 2021/0048551 | A1* | 2/2021 | Dai | E21B 49/005 |
| 2021/0048553 | A1* | 2/2021 | Guner | G01V 3/38 |
| 2021/0048554 | A1* | 2/2021 | Guner | E21B 47/0025 |
| 2021/0055449 | A1* | 2/2021 | Guner | E21B 49/00 |
| 2021/0124081 | A1* | 4/2021 | Donderici | G01V 13/00 |
| 2021/0256671 | A1* | 8/2021 | Guner | G06N 3/08 |
| 2021/0304386 | A1* | 9/2021 | Guner | G06T 1/0014 |
| 2021/0340860 | A1* | 11/2021 | Guner | E21B 47/0025 |
| 2021/0355812 | A1* | 11/2021 | Fouda | G01V 3/30 |

FOREIGN PATENT DOCUMENTS

| | | | | |
|---|---|---|---|---|
| CA | 2860395 A1 | * | 7/2013 | E21B 47/00 |
| CA | 2861639 A1 | * | 7/2013 | G01V 3/24 |
| CA | 2874272 A1 | * | 12/2013 | E21B 7/067 |
| CA | 2874272 C | * | 1/2021 | E21B 7/06 |
| CN | 111877490 B | * | 8/2021 | |
| EP | 2182391 A1 | * | 5/2010 | G01V 3/24 |
| EP | 2626507 A1 | * | 8/2013 | G01V 13/00 |
| EP | 2755063 A1 | * | 7/2014 | G01V 3/24 |
| WO | WO-2013101636 A2 | * | 7/2013 | G01V 3/20 |
| WO | WO-2013101691 A1 | * | 7/2013 | G01V 3/26 |
| WO | WO-2013180822 A2 | * | 12/2013 | E21B 44/005 |
| WO | WO-2014110338 A1 | * | 7/2014 | G01V 3/20 |
| WO | 2019088998 A1 | | 5/2019 | |
| WO | WO-2019088988 A1 | * | 5/2019 | G01V 3/24 |
| WO | WO-2019088996 A1 | * | 5/2019 | G01V 13/00 |
| WO | WO-2019088998 A1 | * | 5/2019 | G01V 3/18 |
| WO | WO-2019190532 A1 | * | 10/2019 | G01V 3/38 |
| WO | WO-2019245873 A1 | * | 12/2019 | G01N 27/226 |
| WO | WO-2020081130 A1 | * | 4/2020 | E21B 47/0025 |
| WO | WO-2020086874 A1 | * | 4/2020 | G01V 3/38 |
| WO | WO-2020101653 A1 | * | 5/2020 | E21B 47/0025 |
| WO | WO-2020101692 A1 | * | 5/2020 | E21B 47/0025 |
| WO | WO-2020139363 A1 | * | 7/2020 | G01V 3/30 |
| WO | WO-2020231411 A1 | * | 11/2020 | G01V 3/38 |
| WO | WO-2021221702 A1 | * | 4/2021 | |
| WO | WO-2021154797 A1 | * | 8/2021 | E21B 47/0025 |
| WO | WO-2021167634 A1 | * | 8/2021 | G06N 3/08 |
| WO | WO-2021201886 A1 | * | 10/2021 | G06N 20/00 |
| WO | WO-2021230893 A1 | * | 11/2021 | |

OTHER PUBLICATIONS

Mwachaka et al., "A review of mud pulse telemetry signal impairments modeling and suppression methods", Published online: Jun. 2, 2018—The Authors) 2018. Also, Journal of Petroleum Exploration and Production Technology (2019) 9:779-792 (Year: 2019).*
Wang et al., "Detection performance and inversion processing of logging-while-drilling extra-deep azimuthal resistivity measurements". Petroleum Science (2019) 16:1015-1027—https://doi.org/10.1007/s12182-019-00374-4 (Year: 2019).*
International Search Report, Response and Written Opinion, PCT Application No. PCT/US2020/037292, dated Jan. 27, 2021.

* cited by examiner

MUD ANGLE DETERMINATION BY EQUALIZING THE RESPONSE OF BUTTONS FOR ELECTROMAGNETIC IMAGER TOOLS

TECHNICAL FIELD

The present technology pertains to identifying a mud angle associated with an electromagnetic imager tool, and more particularly, to identifying a mud angle associated with an electromagnetic imager tool based on variations in mud effect removed quantities of tool measurements made by the electromagnetic imager tool.

BACKGROUND

Electromagnetic imager tools have been developed for generating images downhole in wellbores. Specifically, electromagnetic imager tools have been developed to operate in drilling mud to image formations surrounding a wellbore. Electromagnetic imager tools are subject to the mud effect. The mud effect refers to the contribution of the mud to measured impedance. This effect is particularly severe if a formation exhibits low resistivity and/or the distance between the tool's outer surface and the borehole wall, e.g. the formation, is high. Techniques have been developed in order to remove or otherwise minimize the mud effect in an electromagnetic imager tool operating to log a wellbore, e.g. as part of generating images of a surround formation of the wellbore. For example, the Z90 technique has been developed to remove the mud effect for electromagnetic imager tools.

Many of these techniques utilize mud angle in minimizing or otherwise removing the mud effect for electromagnetic imager tools. Mud angle, as used herein is the phase angle of a complex-valued mud impedance of an electromagnetic imager tool. The effectiveness of these techniques in removing the mud effect is strongly dependent on accuracy of an identified mud angle associated with an electromagnetic imager tool. In turn, this can ultimately affect quality and accuracy in images that are processed through these techniques to account for the mud effect. However, often times these techniques rely on inaccurate mud angle estimates to remove the mud effect thereby leading to errors in the application of these techniques. For example, inaccurate mud angle usage can lead to poor image quality and contrast in areas of an image affected by the mud effect. There therefore exist needs for systems and methods for accurately identifying a mud angle for an electromagnetic imager tool.

Actually measuring mud to identify properties of the mud is one way to identify mud angle. Specifically, an electromagnetic imager tool can be operated to just gather measurements of the mud, which can subsequently be used to identify a mud angle. However, can be an inefficient usage of the electromagnetic imager tool. Specifically, operating the electromagnetic imager tool to just take measurements of the mud can waste time during which the electromagnetic imager tool can be operated to actually log a wellbore. Further, the formation still makes contributions to the direct mud measurements, thereby leading to inaccurate mud angle estimates. In some implementations, a tool may be built with a mud cell for directly measuring mud properties but this requires additional parts to be added to the tool as well as a more complicated tool design process. There therefore exist needs for system and methods for efficiently and accurately identifying a mud angle for an electromagnetic imager tool.

BRIEF DESCRIPTION OF THE DRAWINGS

In order to describe the manner in which the features and advantages of this disclosure can be obtained, a more particular description is provided with reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DETAILED DESCRIPTION

Figure 1A:
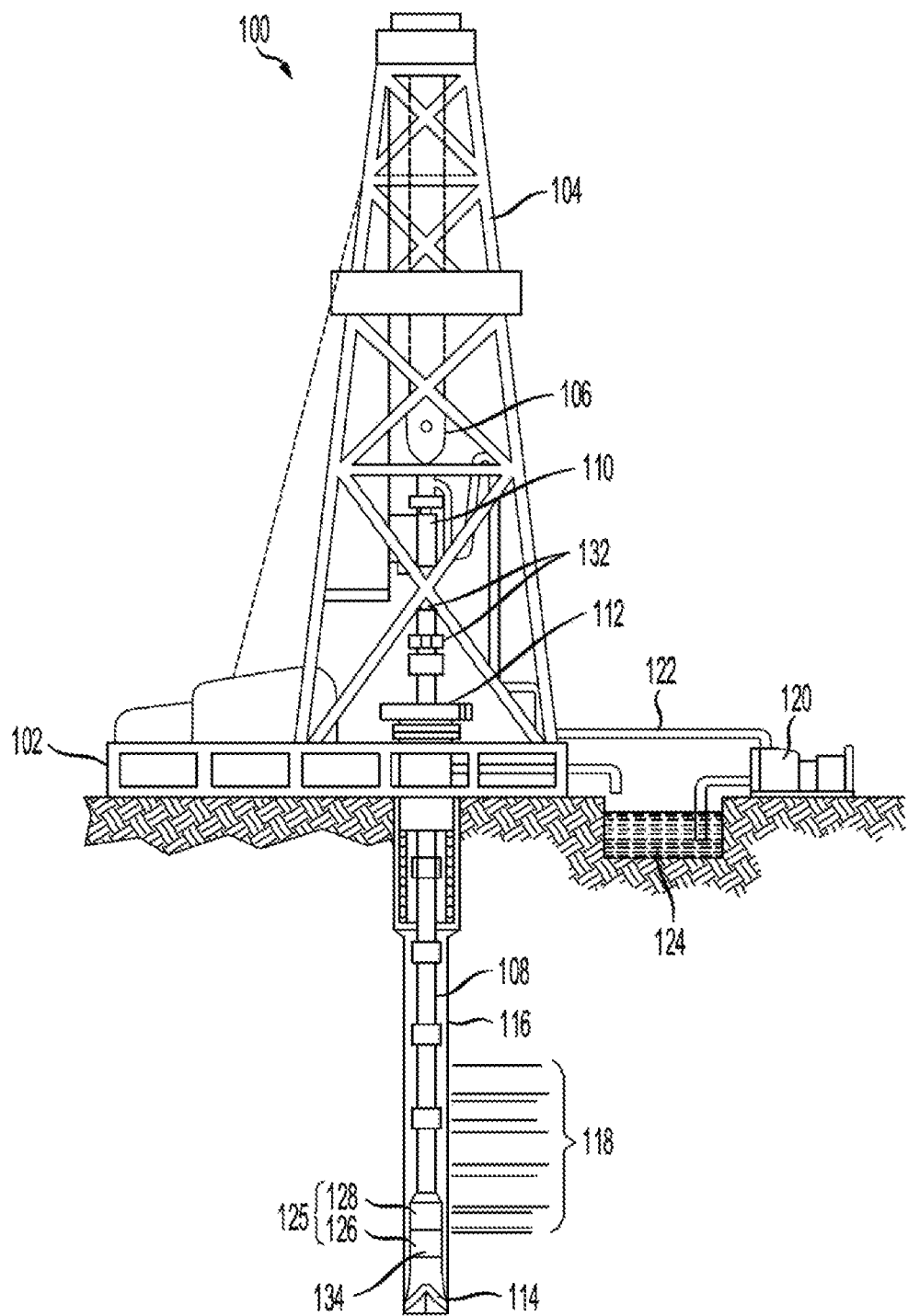
FIG. 1A is a schematic diagram of an example logging while drilling wellbore operating environment, in accordance with various aspects of the subject technology.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Additional features and advantages of the disclosure will be set forth in the description which follows, and in part will be obvious from the description, or can be learned by practice of the principles disclosed herein. The features and advantages of the disclosure can be realized and obtained by means of the instruments and combinations particularly pointed out in the appended claims. These and other features of the disclosure will become more fully apparent from the following description and appended claims or can be learned by the practice of the principles set forth herein.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

In various embodiments, for a multi-frequency tool the techniques described herein can be repeated for measurements at each of the operating frequencies of the tool.

Turning now to FIG. 1A, a drilling arrangement is shown that exemplifies a Logging While Drilling ("LWD") configuration in a wellbore drilling scenario 100. Logging-While-Drilling typically incorporates sensors that acquire formation data Specifically, the drilling arrangement shown in FIG. 1A can be used to gather formation data through an electromagnetic imager tool as part of logging the wellbore using the electromagnetic imager tool. The drilling arrangement of FIG. 1A also exemplifies what is referred to as Measurement While Drilling ("MWD") which utilizes sensors to acquire data from which the wellbore's path and position in three-dimensional space can be determined. FIG. 1A shows a drilling platform 102 equipped with a derrick 104 that supports a hoist 106 for raising and lowering a drill string 108. The hoist 106 suspends a top drive 110 suitable for rotating and lowering the drill string 108 through a well head 112. A drill bit 114 can be connected to the lower end of the drill string 108. As the drill bit 114 rotates, it creates a wellbore 116 that passes through various subterranean formations 118. A pump 120 circulates drilling fluid through a supply pipe 122 to top drive 110, down through the interior of drill string 108 and out orifices in drill bit 114 into the wellbore. The drilling fluid returns to the surface via the annulus around drill string 108, and into a retention pit 124. The drilling fluid transports cuttings from the wellbore 116 into the retention pit 124 and the drilling fluid's presence in the annulus aids in maintaining the integrity of the wellbore 116. Various materials can be used for drilling fluid, including oil-based fluids and water-based fluids.

Logging tools 126 can be integrated into the bottom-hole assembly 125 near the drill bit 114. As the drill bit 114 extends into the wellbore 116 through the formations 118 and/or as the drill string 108 is pulled out of the wellbore 116, logging tools 126 collect measurements relating to various formation properties as well as the orientation of the tool and various other drilling conditions. The logging tool 126 can be applicable tools for collecting measurements in a drilling scenario, such as the electromagnetic imager tools described herein. Each of the logging tools 126 may include one or more tool components spaced apart from each other and communicatively coupled by one or more wires and/or other communication arrangement. The logging tools 126 may also include one or more computing devices communicatively coupled with one or more of the tool components. The one or more computing devices may be configured to control or monitor a performance of the tool, process logging data, and/or carry out one or more aspects of the methods and processes of the present disclosure.

The bottom-hole assembly 125 may also include a telemetry sub 128 to transfer measurement data to a surface receiver 132 and to receive commands from the surface. In at least some cases, the telemetry sub 128 communicates with a surface receiver 132 by wireless signal transmission, e.g., using mud pulse telemetry, EM telemetry, and/or acoustic telemetry. In other cases, one or more of the logging tools 126 may communicate with a surface receiver 132 by a wire, such as wired drill pipe. In some instances, the telemetry sub 128 does not communicate with the surface, but rather stores logging data for later retrieval at the surface when the logging assembly is recovered. In at least some cases, one or more of the logging tools 126 may receive electrical power from a wire that extends to the surface, including wires extending through a wired drill pipe. In other cases, power is provided from one or more batteries and/or via power generated downhole.

Collar 134 is a frequent component of a drill string 108 and generally resembles a very thick-walled cylindrical pipe, typically with threaded ends and a hollow core for the conveyance of drilling fluid. Multiple collars 134 can be included in the drill string 108 and are constructed and intended to be heavy to apply weight on the drill bit 114 to assist the drilling process.

Figure 1B:
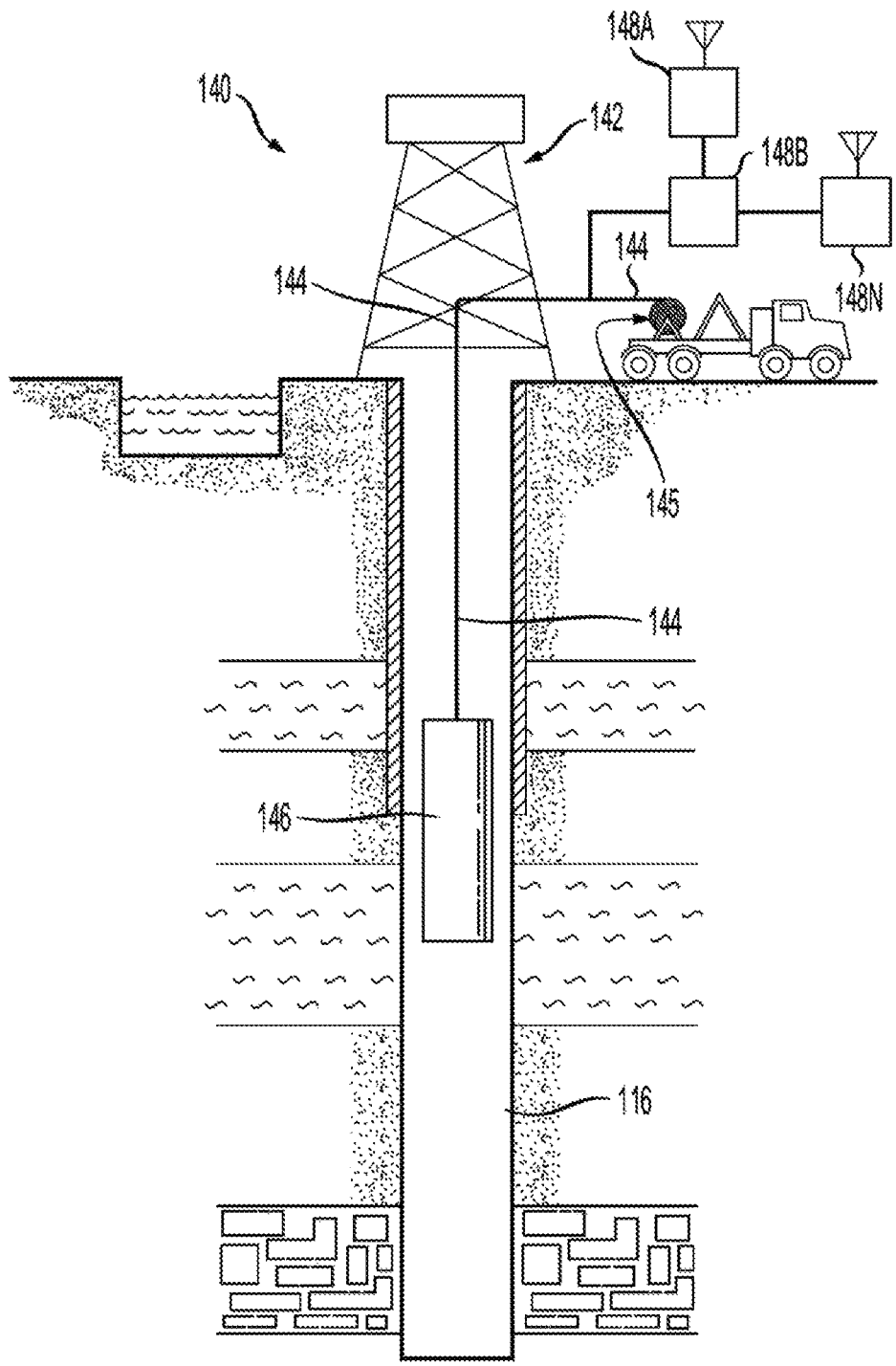
FIG. 1B is a schematic diagram of an example downhole environment having tubulars, in accordance with various aspects of the subject technology.

Referring to FIG. 1B, an example system 140 is depicted for conducting downhole measurements after at least a portion of a wellbore has been drilled and the drill string removed from the well. An electromagnetic imager tool can be operated in the example system 140 shown in FIG. 1B to log the wellbore. A downhole tool is shown having a tool body 146 in order to carry out logging and/or other operations. For example, instead of using the drill string 108 of FIG. 1A to lower tool body 146, which can contain sensors and/or other instrumentation for detecting and logging nearby characteristics and conditions of the wellbore 116 and surrounding formations, a conveyance 144 can be used. The tool body 146 can be lowered into the wellbore 116 by conveyance 144. The conveyance 144 can be anchored in the drill rig 142 or by a portable means such as a truck 145. The conveyance 144 can include one or more wirelines, slicklines, cables, and/or the like, as well as tubular conveyances such as coiled tubing, joint tubing, or other tubulars. The downhole tool can include an applicable tool for collecting measurements in a drilling scenario, such as the electromagnetic imager tools described herein.

The illustrated conveyance 144 provides support for the tool, and, in one or more embodiments, provides power to the tool and/or enables communication between data processors 148A-N on the surface. In some examples, the conveyance 144 can include electrical and/or fiber optic cabling for carrying out communications. The conveyance 144 is sufficiently strong and flexible to tether the tool body 146 through the wellbore 116. In one or more embodiments the conveyance 144 permits communication therethrough to one or more of the processors 148A-N, which can include local and/or remote processors. The processors 148A-N can be integrated as part of an applicable computing system, such as the computing device architectures described herein. Moreover, power can be supplied via the conveyance 144 to meet power requirements of the tool. In one or more embodiments, e.g. slickline or coiled tubing configurations, power can be supplied downhole with a battery or via a downhole generator.

Figure 2A:
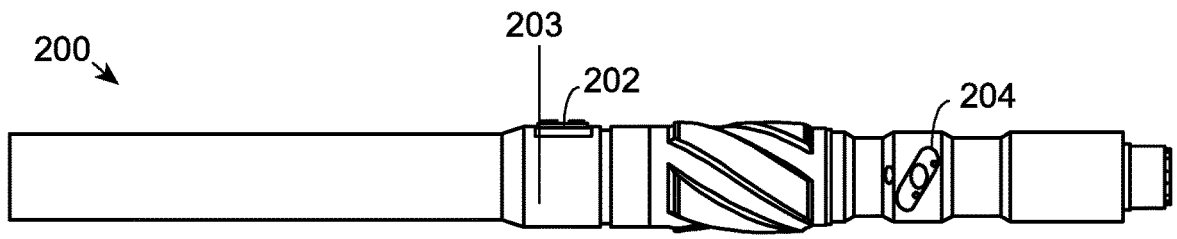
FIG. 2A illustrates a perspective view of a LWD electromagnetic imager tool.
Figure 2B:
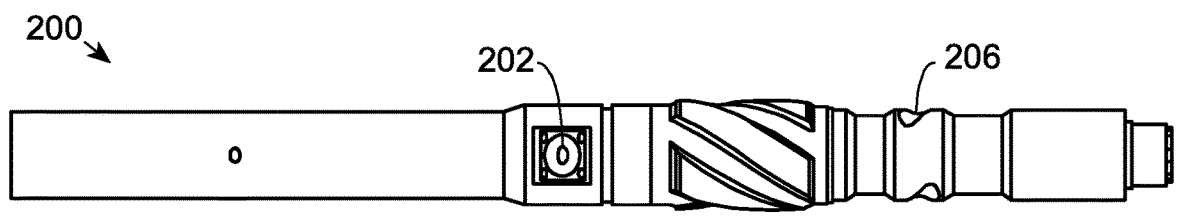
FIG. 2B illustrates another perspective view of the LWD electromagnetic imager tool.
Figure 2C:
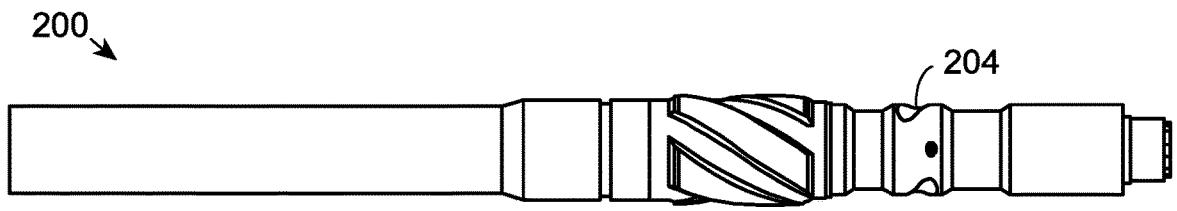
FIG. 2C illustrates yet another perspective view of the LWD electromagnetic imager tool.

FIG. 2A illustrates a perspective view of a LWD electromagnetic imager tool 200. FIG. 2B illustrates another perspective view of the LWD electromagnetic imager tool 200. FIG. 2C illustrates yet another perspective view of the LWD electromagnetic imager tool 200. The LWD electromagnetic imager tool 200/mud imager tool can be integrated as part of an applicable LWD drilling system, such as the logging tools 126 in the LWD scenario 100 shown in FIG. 1A.

The LWD electromagnetic imager tool 200 includes an electromagnetic sensor 202 disposed along a collar of the LWD electromagnetic imager tool 200. The LWD electromagnetic 200 imager tool shown in FIGS. 2A-2C also includes first and second ultrasonic transducers 204 and 206, however and in various embodiments, a LWD electromagnetic imager tool 200 does not have ultrasonic transducers disposed along the collar. Specifically, the LWD electromagnetic imager tool 200 shown in FIGS. 2A-2C is merely an example of a LWD electromagnetic imager tool 200, and in various embodiments, a LWD electromagnetic imager tool 200 can have a different design. Specifically, a water-based LWD mud imager tool may have similar designs, and can provide less design and interpretation complications than oil-based LWD mud imager tools, e.g. due to the conductive nature of water-based mud.

LWD electromagnetic mud imager tools can provide a high resolution image of a borehole, e.g. when compared to other borehole imager tools. As a result, LWD electromagnetic mud imager tools can be used to identify damaged borehole sections, provide a better knowledge on the thin beds, and also provide images that can be used to determine the dip angle of formation bed.

The sensor topology of LWD electromagnetic mud imager tools operating in a LWD environment should have minimum complexity, and more importantly, it should not rely on borehole contact. With respect to the LWD electromagnetic imager tool 200 shown in FIGS. 2A-C, the electromagnetic sensor 202 can include a single measurement (also called probe, button or current) electrode mounted on the side of the collar. The electromagnetic sensor 202 can be disposed on the collar such that it is located at a certain distance (standoff) from a borehole wall during operation of the LWD electromagnetic imager tool. Further, the electromagnetic sensor 202 can include a guard electrode that surrounds, at least a portion of the button electrode. This electrode may be excited by an alternating current, sine-wave generator, and it may be coupled to the formation through a mud, e.g. an oil-based mud. This mud is non-conductive for oil-based muds. As a result, the coupling to the formation is accomplished through displacement currents in the mud. This arrangement provides a low sensitivity to standoff changes in resultant microresistivity image.

In operation of the LWD electromagnetic imager tool 200, a measurement current enters the formation, which may have a much lower resistivity than the mud. In the formation, the current flows by conduction and penetrates the formation. The current then returns back toward the borehole where it returns to the body of the LWD electromagnetic imager tool 200 surrounding the electromagnetic sensor 202, e.g. the tool body 203 serves as the return electrode for the LWD electromagnetic imager tool 200. The tool body can remain at ground potential because of its large surface area.

Imaging through the LWD electromagnetic imager tool 200 can be achieved by dividing gathered data/measurements into azimuthal bins as the LWD electromagnetic imager tool 200 rotates in the borehole during drilling. The LWD electromagnetic imager tool can also include an additional mud resistivity sensor, e.g. a mud cell. In imaging through the LWD electromagnetic imager tool 200, real components of the measurements made by the electromagnetic sensor 202 can be used to determine formation resistivity. Further, mud resistivity measurements made by the mud resistivity sensor can be used to improve the determined formation resistivity measurements. For the purposes of this disclosure, it is assumed that mud sensor may not be available or may not be accurate.

The LWD electromagnetic imager tool 200 can be a multi-frequency tool. Specifically, the LWD electromagnetic imager tool 200 can operate at multiple frequencies in gathering measurements. For example, a higher frequency in the MHz range may be used to overcome the nonconductive nature of oil-based muds in generating measurements while a lower frequency in the 100 kHz range may be more sensitive to standoff and thus may be used in standoff determination. Further, gathered standoff information may be used to identify features in the formation. For example, a thin band of increased resistivity can be due to an opening in the rock. In turn, this can be reflected as a jump in apparent standoff.

Figure 3:
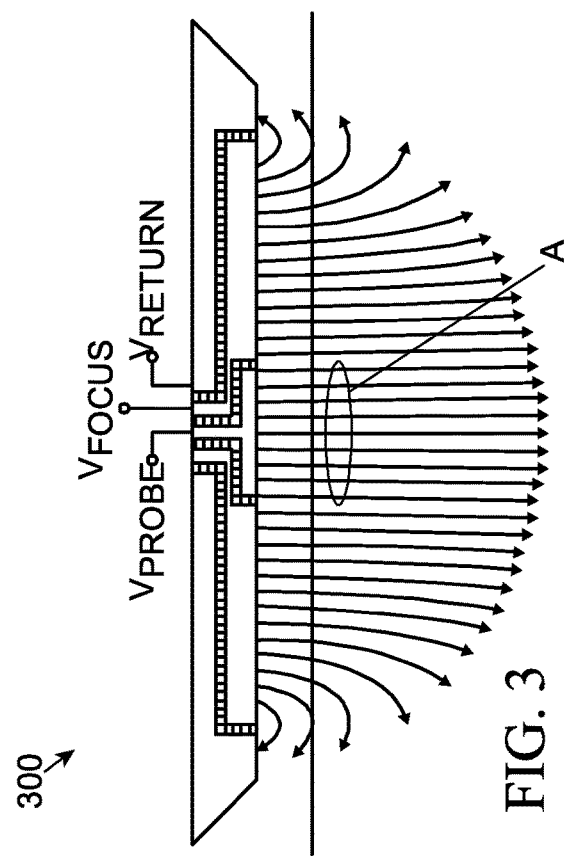
FIG. 3 shows an example current density generated by the electromagnetic sensor of the LWD electromagnetic imager tool operating to measure a formation.

FIG. 3 shows an example current density 300 generated by the electromagnetic sensor 202 of the LWD electromagnetic imager tool 200 operating to measure a formation. A power source drives a voltage between the return electrode, whose voltage with respect to the ground is represented through $V_{return}$ and the probe electrode, whose voltage with respect to a ground is represented by $V_{probe}$. Further, a circuitry is implemented to keep $V_{probe}$ equal, or roughly equal, to $V_{focus}$ for focusing of the measurement current. The current transmitted from the electromagnetic sensor is measured, for example through the use of a toroid. The ratio of the voltage difference between probe and return to the transmitted current is used to calculate a measured impedance. A basic circuit theory based model that relates the measured impedance to formation and mud parameters that is applicable to both LWD and wireline tools will be provided after a discussion on wireline electromagnetic imager tools.

Figure 4:
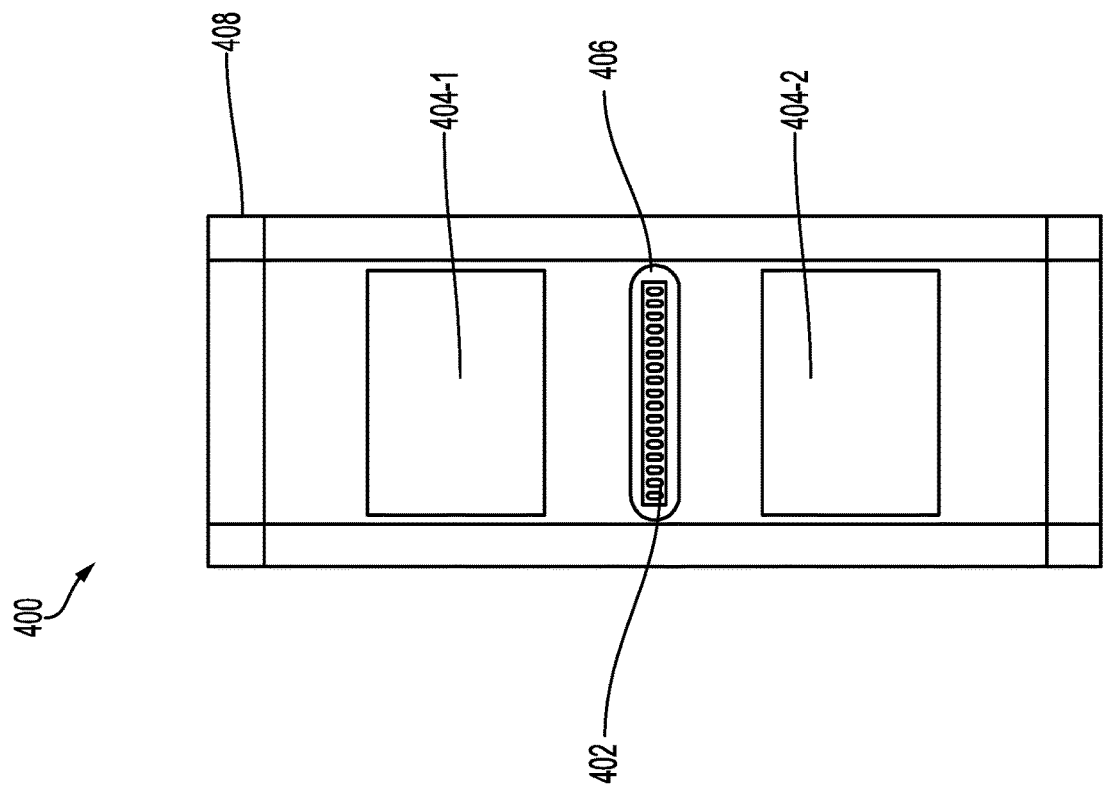
FIG. 4 illustrates a schematic diagram of an example pad of an electromagnetic imager tool, in accordance with various aspects of the subject technology.

The discussion now continues with a discussion of wireline electromagnetic imager tools. FIG. 4 illustrates a schematic diagram of an example pad 400 of a wireline electromagnetic imager tool, as described above in FIG. 1B. Specifically, the wireline electromagnetic imager tool can be integrated with the tool body 146 of the downhole tool in FIG. 1B. More specifically, the pad 400 can be disposed on an outer surface of the tool body 146 to make measurements as the downhole tool, e.g. the LWD electromagnetic imager tool 200, is operated within the wellbore. The electromagnetic imager tool functions to gather measurements while logging a wellbore, e.g. for purposes of imaging a formation surrounding the wellbore. Specifically, the electromagnetic imager tool can operate in a drilling mud to gather measurements for imaging the formation surrounding the wellbore. The electromagnetic imager tool can operate in an applicable type of drilling mud, such as an oil-based mud or a water-based mud, to log the wellbore. Oil-based muds have much higher resistivities than water-based muds; therefore, the mud effect is much stronger for measurements made in oil-based muds. In operating to log the wellbore, the electromagnetic imager tool can gather applicable measurements that are capable of being measured by the electromagnetic imager tool. For example, measurements made by the electromagnetic imager tool can include apparent impedivity and impedance measurements at the electromagnetic imager tool, complex impedance measurements at the electromagnetic imager tool, voltage measurements at the electromagnetic imager tool, current measurements at the electromagnetic imager tool, phase measurements at the electromagnetic imager tool, and absolute values of impedance measurements at the electromagnetic imager tool.

The measurements gathered by the electromagnetic imager tool can be used to identify values of mud and formation parameters associated with the electromagnetic imager tool, e.g. parameters inside of and outside of the wellbore. Mud and formation parameters include applicable parameters that can be identified from measurements taken by the electromagnetic imager tool for purposes of imaging, e.g. through the wellbore. For example, mud and formation parameters can include mud permittivity, mud resistivity, standoff, formation permittivity of a formation of the wellbore, and formation resistivity of the formation of the wellbore. The values of the mud and formation parameters can be identified using the techniques described herein on a per-button basis for wireline imagers. For example, formation resistivity, formation permittivity, mud resistivity, mud permittivity and standoff values can be identified for each button included as part of the button array 402 of the pad 400. Among these parameters, formation resistivity is the parameter that generally has the greatest correlation to the measured raw image. For this reason, raw images or images where raw measurements has gone through simple, approximate processing techniques, such as the aforementioned mud angle removal techniques, may be used to obtain qualitative information on the features associated with formation resistivity. Other formation and mud parameters may be determined through more advanced techniques such as inversion. For LWD imagers, measurements are generally obtained using a single button electrode. In that case, azimuthal coverage is obtained by dividing the measurements into azimuthal bins as the tool rotates. Thus, these azimuthal bins in an LWD tool serves the same purpose with the measurements made by multiple button electrodes spaced circumferentially around the tool in a wireline tool. Although the origin of the measurements are different in LWD and wireline tools, the processing methods described herein equally applies to both type of tools.

In operating the electromagnetic imager tool to gather measurements for imaging, a voltage difference can be applied across the button array 402 and first and second return electrodes 404-1 and 404-2 (return electrodes 404) of the pad 400. This voltage difference can generate currents that pass from the button array 402 into the mud and a surrounding formation. The pad 400 also includes a guard electrode 406 around the button array 402. The same potential that is applied to the button array 402 can be applied to the guard electrode 406 to focus all or a substantial portion of the current emitted into the mud and the surrounding formation. Specifically, the current can be emitted substantially radially into the surrounding formation by applying the same potential on the guard electrode 406 and the button array 402. An applicable electrical and/or thermal insulating material, such as a ceramic, can fill the remaining portions of the pad 400. For example, a ceramic material can be disposed between the return electrodes 404 and the guard electrode 406.

The pad 400 is covered, at least in part, with a housing 408. The housing 408, and accordingly the pad 400 through the housing 408, can be connected through a securing mechanism to a mandrel. The securing mechanism can be a movable mechanism that moves the housing 408 and the contained pad 400 to substantially maintain contact with the formation. For example, the securing mechanism can include an arm that opens and/or swivels to move the housing 408 and the contained pad 400. By moving the housing 408 and the contained pad to maintain a good contact with the formation, the mud effect can be minimized for wireline imager tools.

Turning back to a discussion of the mud effect and its impact on electromagnetic imager tools, the mud effect, as discussed previously, refers to the contribution of the mud to the measured impedance.

Further and as discussed previously, the mud effect refers to the contribution of the mud to the measured impedance. Further, as discussed previously, this effect is particularly severe if a formation exhibits low resistivity and/or the distance between the button electrode's outer surface and the borehole wall, e.g. the formation, is high. In those instances, measured impedance may have very low sensitivity to the formation features. Maintaining good contact between the pad 400 and the formation can help wireline imager tools to ensure that the electromagnetic imager tool actually measures the formation and not just the mud when the formation has low resistivity. Since mud effect is a function of standoff, the term standoff effect is used interchangeably with mud effect in this disclosure. As will be discussed in greater detail later, the mud effect can be minimized or removed using an applicable technique, such as the techniques described herein. Further, the mud effect can be minimized or removed based on a mud angle determined using an applicable technique, such as the techniques described herein.

Figure 5:
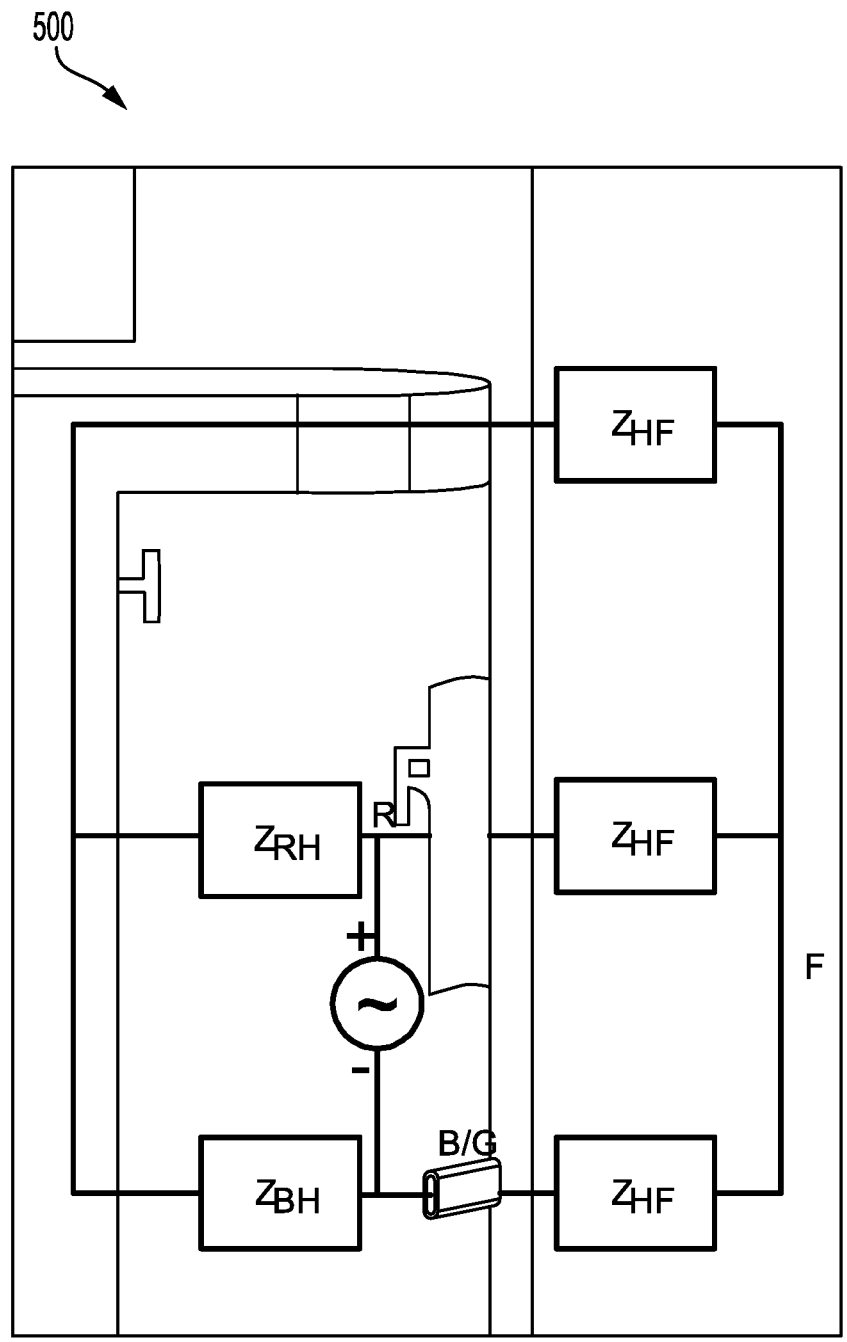
FIG. 5 illustrates a circuit model of the example pad illustrated in FIG. 4, in accordance with various aspects of the subject technology.

FIG. 5 illustrates a circuit model of the example pad 400 illustrated in FIG. 4. Although the exact design of the tool is different for LWD tools, the equations derived for the circuit model shown in FIG. 5 are applicable for LWD tools. In the model, H denotes the housing (including the mandrel), F denotes the formation, either B or G denotes the button and guard assembly, and R denotes the return signal from the formation and/or the mud. While most of the transmitted current can be returned to the return electrodes, some portions of the transmitted current can return through the housing and/or the mandrel. An impedance value for each button can be calculated by measuring the voltage between the buttons and the return electrodes and dividing the measured voltage by the current transmitted through each button of the button array. Specifically, this technique is represented in Equation 1 shown below. In Equation 1, Z is the button impedance of one of the buttons in the button array, $V_{BR}$ is the button to return voltage, and $I_B$ is the button current. With respect to the LWD tools described in FIGS.

2A-C and FIG. 3, $V_{BR}$ can be replaced with the probe to return voltage, and $I_B$ can be replaced with the current of the probe.

$$Z = \frac{V_{BR}}{I_B} \qquad \text{Equation 1}$$

A calculated button/electrode impedance, e.g. calculated by Equation 1, can be equal to the impedances of the button and guard assembly and the formation $Z_{BF}$ and the impedances of the return and the formation $Z_{RF}$, as shown in the circuit model in FIG. 5. While $Z_{BF}$ and $Z_{RF}$ are denoted with respect to the formation F, $Z_{BF}$ and $Z_{RF}$ can have contributions from both the mud and the formation. Thus, $Z_{BF}$ can equivalently be represented by Equation 2 shown below.

$$Z \approx Z_{BF} = Z_{mud} + Z_F \qquad \text{Equation 2}$$

Accordingly, a measured button/electrode impedance, as shown in Equation 2, can have contributions from both the mud and the formation. If the imaginary parts of $Z_F$ and $Z_{mud}$ are mainly capacitive, and assuming this capacitance is in parallel with the resistive portion, $Z_{BF}$ can also be written as shown in Equation 3 below.

$$Z_{BF} = \frac{1}{\left(\frac{1}{R_M} + j\omega C_M\right)} + \frac{1}{\left(\frac{1}{R_F} + j\omega C_F\right)} \qquad \text{Equation 3}$$

In Equation 3, R and C denote the resistance and capacitance and $\omega$ is the angular frequency (e.g. $\omega=2\pi f$ where f is the frequency in Hz). In Equation 3, subscript M denotes the mud while F denotes the formation. Both the mud resistance and mud capacitance can increase with standoff and decrease with the effective areas of the buttons.

Equation 3 can provide just a basic approximation to the impedance measured by the electromagnetic imager tool. However, Equation 3 can be useful in illustrating the effects of mud and formation parameters on the measured impedance. Specifically, from Equation 3, it can be deduced that high frequencies are needed to reduce the mud contribution to the measured impedance.

Figure 6:
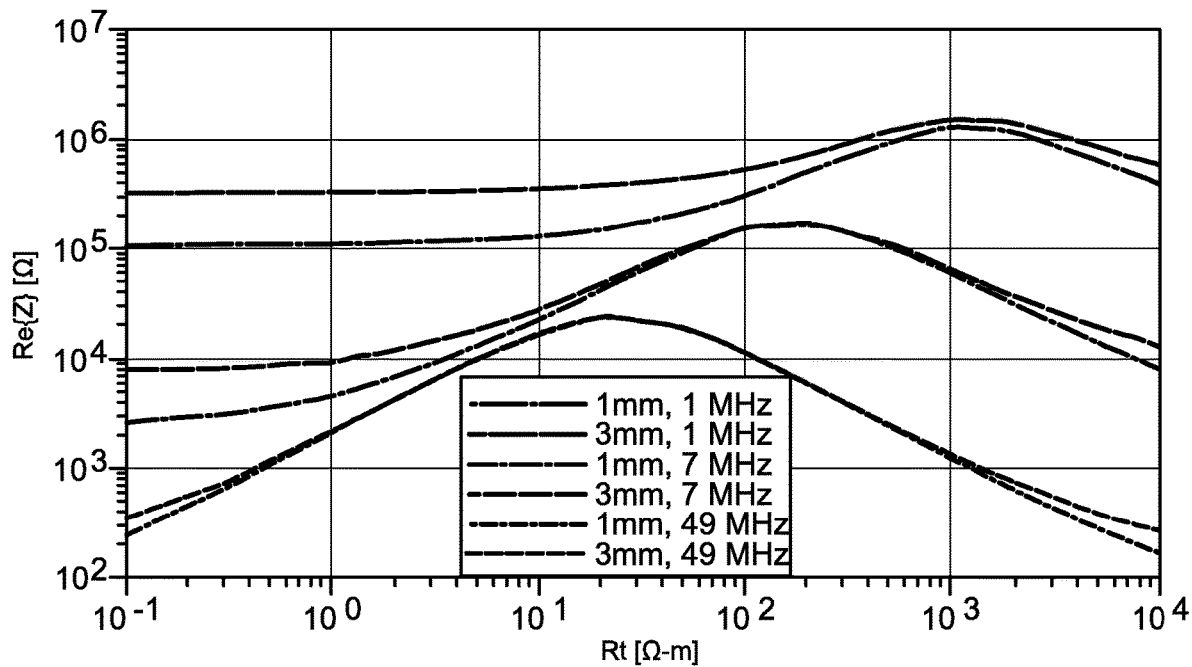
FIG. 6 is a plot of impedances measured by the electromagnetic imager tool versus formation resistivity $R_t$, in accordance with various aspects of the subject technology.

FIG. 6 is an example plot of real parts of the impedances measured by the electromagnetic imager tool versus formation resistivity $R_t$. In the example plot shown in FIG. 6, it is assumed that formation permittivity ($\varepsilon_F$) is 15, mud permittivity ($\varepsilon_M$) is 6, and mud resistivity ($\rho_M$) is 8000 Ω-m. Results for three different frequencies (1 MHz, 7 MHz and 49 MHz) at two different standoffs (1 mm and 3 mm) are shown. Standoff, as used herein, is the distance of the button electrode's outer surface from the borehole wall. It can be seen from FIG. 6 that there is a separation between different standoffs at lower formation resistivities. This effect can be more pronounced if the frequency is lower. At higher formation resistivities, the dielectric effect in the formation becomes more important and causes a roll-off in measured impedance.

With respect to the mud effect, it can be desirable to operate in a linear region of the curves shown in FIG. 6. Specifically, operating in a linear region can lead to a more accurate correspondence between the real parts of impedance and the true formation resistivity. Further, the mud effect at low formation resistivities can cause an ambiguity in the interpretation of impedance, e.g. through impedance images.

Figure 7:
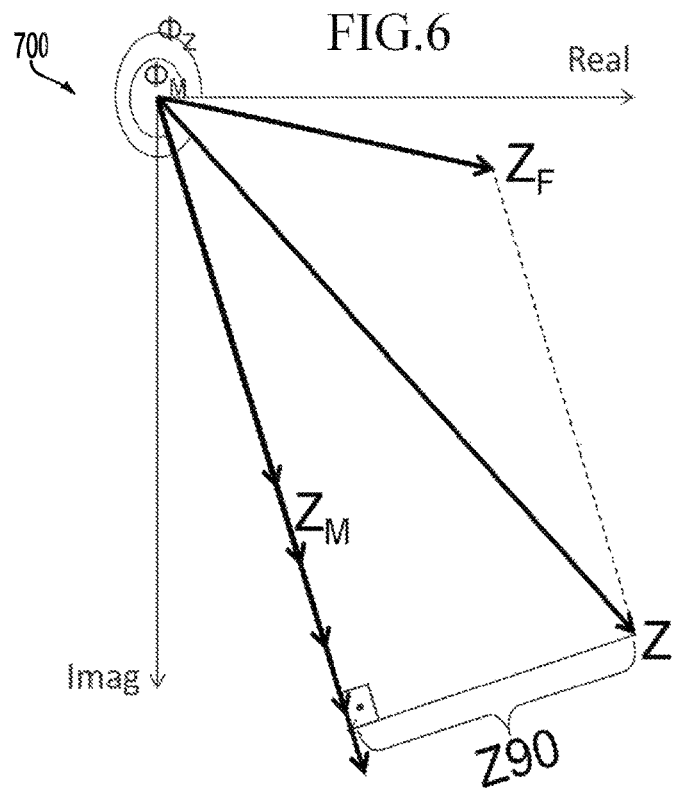
FIG. 7 is a plot of impedances in the complex plane and corresponding Z90 processing of the impedances, in accordance with various aspects of the subject technology.

The description now turns to a discussion of the Z90 processing technique for reducing the mud effect. FIG. 7 is a plot 700 of impedances in the complex plane and corresponding Z90 processing of the impedances. While the Z90 processing technique is discussed throughout this paper, the techniques for identifying mud angle described herein, can be implemented in an applicable processing technique that utilizes a mud angle associated with the electromagnetic imager tool.

Z90 processing is applied to reduce the mud effect and make the response of the mud imager tool, e.g. the impedance response, more linear. In the plot 700 shown in FIG. 7, measured impedance Z, mud impedance $Z_M$, and formation impedance $Z_F$ are shown as vectors in the complex plane. Although the approximate direction of the mud impedance vector $Z_M$ can be known, the strength of the vector depends on a number of factors including standoff. However, an orthogonal projection of Z on $Z_M$ can be calculated accurately by measuring the phase angle of the measured impedance, $\phi_X$, and the phase angle of the mud impedance, $\phi_M$, also referred to as the mud angle. This is applicable to Z90 processing because Z90 processing functions by removing the orthogonal projection of the measured impedance Z on the mud impedance vector $Z_m$ from the measured impedance Z. In turn, this can reduce or remove the mud effect. The resultant impedance created through Z90 processing, Z90, can be represented as shown below in Equation 4.

$$Z90 = |Z|\sin(\varphi_Z - \varphi_M) \qquad \text{Equation 4}$$

Figure 8:
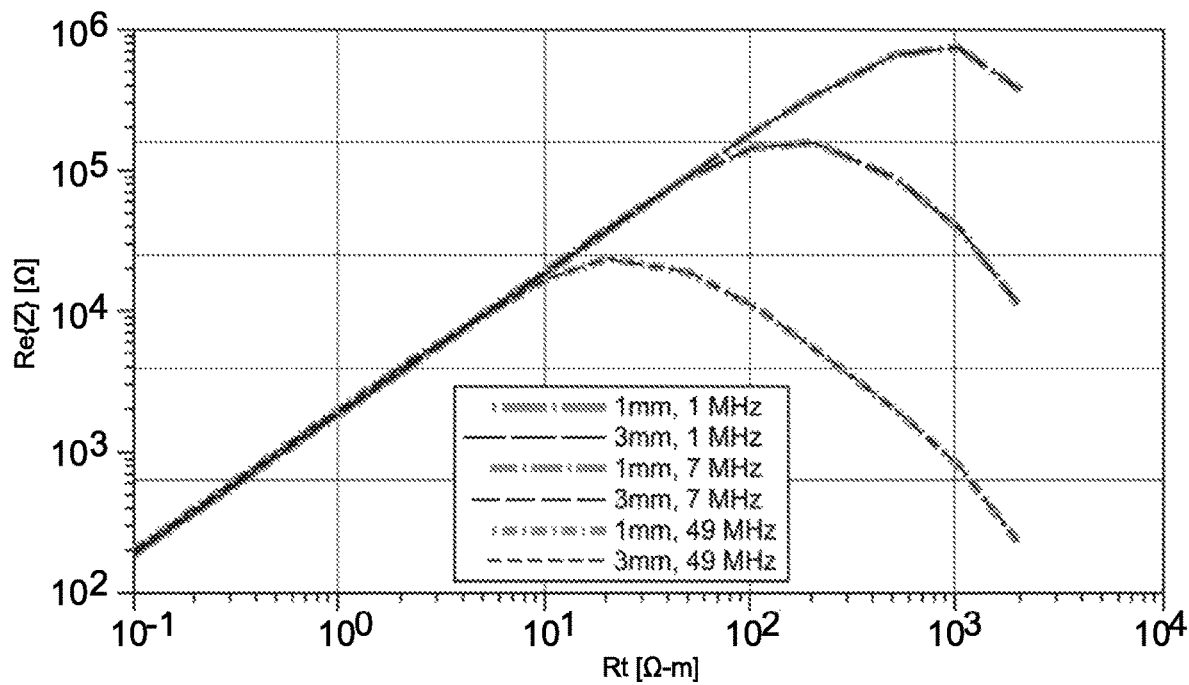
FIG. 8 is a plot of real parts of simulated impedances measured by the electromagnetic imager tool versus simulated formation resistivities $R_t$ after Z90 processing is applied, in accordance with various aspects of the subject technology.

FIG. 8 is a plot of real parts of simulated impedances measured by the electromagnetic imager tool versus simulated formation resistivities $R_t$ after Z90 processing is applied. Specifically, FIG. 8 is a plot of the impedances shown in FIG. 6 after Z90 processing is performed. As shown in the plot in FIG. 8, the impedance response is more linear across a wider range of formation resistivities after Z90 processing, corresponding to removal of the mud effect from the impedance measurements.

As shown in Equation 4, Z90 processing is dependent on the mud angle, $\phi_M$, associated with the electromagnetic imager tool. In an ideal scenario, the mud angle is assumed to be known, e.g. mud cell measurements or measurements in a cased section of a wellbore. If the mud angle is perfectly known, then Z90 will not have any mud contribution and thus, will be equal to a weighted sum of the real part of formation impedance and the imaginary part of the formation impedance. This is indicated in Equation 5 shown below.

$$Z90 \approx w_1 \operatorname{Re}\{Z_F\} + w_2 \operatorname{Im}\{Z_F\} \qquad \text{Equation 5}$$

If it is further assumed that the imaginary part of the formation impedance can be neglected, then Z90 will indeed be a very good approximation to the real formation impedance, as shown in Equation 5.

The plot shown in FIG. 8 was made by applying the Z90 processing technique with correct mud angles identified through simulation. Specifically, the mud angles were identified for a circuit representation of an applicable wireline or LWD electromagnetic imager tool, such as the circuit model for the pad 200 shown in FIG. 5. The correct mud angles identified for the different frequencies are shown in Table 1 below.

TABLE 1

| 1 MHz | 7 MHz | 49 MHz |
|---|---|---|
| −69.47° | −86.9377° | 89.5621° |

Although the term "mud angle" is used in its singular form throughout this discussion, this is done for simplicity and it is appreciated that mud angle actually varies with frequency.

While the plot shown in FIG. 8 was made using accurate mud angles, as discussed previously, the correct mud angle is not actually known in most scenarios and an inaccurate estimate of the mud angle is often used. This can ultimately impact processes, e.g. the Z90 technique, that utilize the mud angle associated with the electromagnetic imager tools.

As discussed previously, one solution to using incorrect mud angle estimates is to directly measure the mud through the electromagnetic imager tool. This measurement can be made by closing the arms of a wireline tool, e.g. when the tool is implemented in a wireline design, such that contributions from formation resistivity in the tool response are minimized. However, and as discussed previously, this is an inefficient usage of the electromagnetic imager tool. Furthermore, this technique is not applicable to LWD tools. Even for wireline tools, the direct measurements made by the tool will still include some formation contributions as well as measurement noise which can negatively impact Z90 processing results. Proximity to the tool body may alter the response of the tool as well that may not be accounted by simple calibration schemes. Alternatively, a dedicated mud cell may be included in the tool but this brings forth additional design complexities in addition to the costs associated with incorporating this extra part to the tool. To illustrate the formation contribution and measured noise, the identified mud angle values are shifted 0.5° from their exact values, as shown in Table 2 below.

TABLE 2

| 1 MHz | 7 MHz | 49 MHz |
|---|---|---|
| −68.97° | −86.4377° | 89.0621° |

Figure 9:
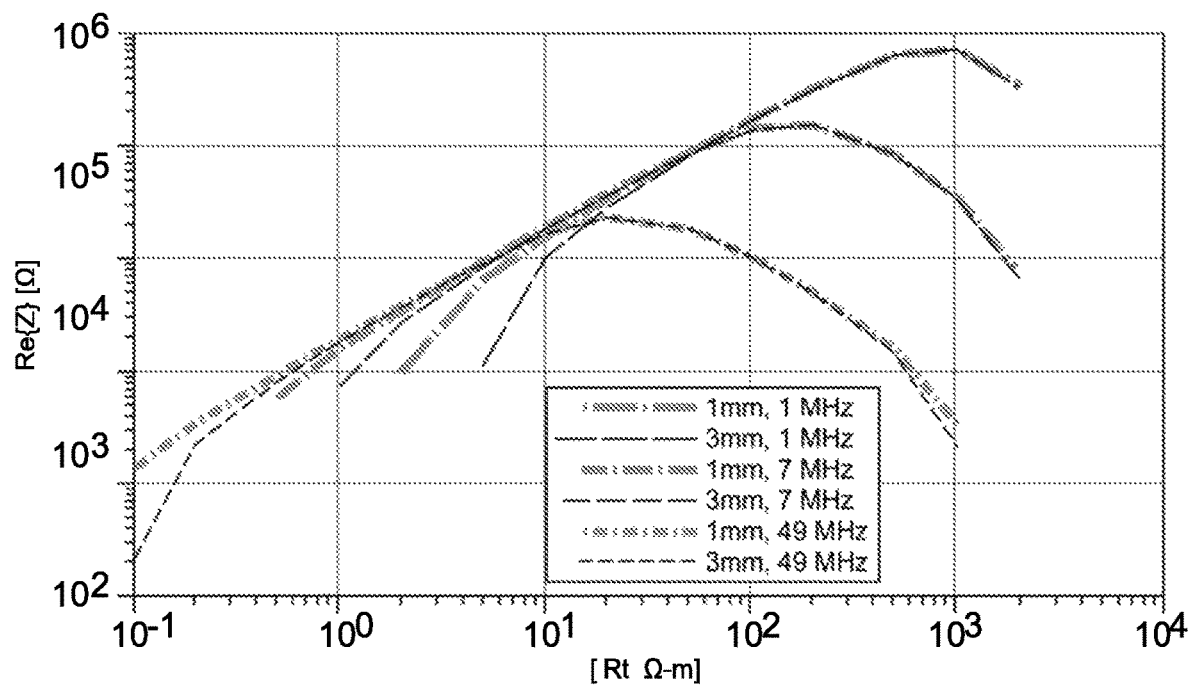
FIG. 9 is a plot of real parts of simulated impedances measured by the electromagnetic imager tool versus simulated formation resistivities $R_t$ after Z90 processing is performed on the shifted mud angles, in accordance with various aspects of the subject technology.

FIG. 9 is a plot of real parts of simulated impedances measured by the electromagnetic imager tool versus simulated formation resistivities $R_t$ after Z90 processing is performed on the shifted mud angles. Specifically, the plot shown in FIG. 9 is meant to illustrate the effects of direct mud measurements and associated noise on Z90 processing. As shown in FIG. 9, even a deviation as small as 0.5° from the correct value of the mud angle can cause large errors in the processed results. Specifically, this plot shows that an incorrect mud angle, be it as a result of direct mud measurements, noise, and or an incorrect assumption of the mud angle, leads to large errors in the processed results.

The techniques described herein can be used in identifying an accurate mud estimate of an electromagnetic imager tool, e.g. for purposes of applying a mud removal effect to tool measurements gathered by the electromagnetic imager tool. Specifically, the techniques described herein can be used to solve the previously described deficiencies by identifying a mud angle estimate for an electromagnetic imager tool based on measurements made by the electromagnetic imager tool. More specifically, the techniques described herein can identify a mud angle estimate for an electromagnetic imager tool based on variations in mud effect corrected measurements made by the electromagnetic imager tool. In turn, this can provide a more accurate mud angle estimate. Further, this can conserve resources by eliminating the need to take direct mud measurements.

The disclosure now continues with a description of the principles that form the basis for identifying mud angle estimates based on variations in mud effect corrected measurements made by the electromagnetic imager tool. Impedance measurements obtained by the electromagnetic imager tool have contributions from both the formation and the mud. While local variations and inhomogeneities in formation properties exist, over a large enough formation interval, these variations can cancel out. For example, over a large enough interval, a resistivity of a formation tends to average out to the same quantity, despite variations in the resistivity across the formation. This is based on the law of large numbers under the assumption that the expected formation impedance for all the buttons can be the same. Specifically, when enough samples are taken and averaged by the electromagnetic imager tool, the difference between formation contributions can converge toward the same value across the buttons for wireline tools or across the azimuthal bins for LWD tools. As a result, the primary differences between measurements of different buttons or azimuthal bins after averaging the measurements are from the mud contribution to the measurements instead of the formation contribution to the measurements.

Specifically the primary differences between the measurements of the different buttons or azimuthal bins are due to variations of the standoff, e.g. the mud effect, between the buttons or azimuthal bins instead of differences between formation properties when enough samples are averaged. Buttons and electrodes are used interchangeably throughout this description. More specifically, an electrode can refer to a single button within the button array that is configured to form a current between the electromagnetic imager tool and both mud and the surrounding formation.

It is noted that even when a formation is inhomogeneous, the expected formation impedance can still be assumed to be the same for all of the buttons/electrodes or azimuthal bins of the electromagnetic imager tool. More specifically, when a formation is inhomogeneous, the expected formation impedance can be assumed to be the same for all buttons or azimuthal bins as long as the formation varies the same way for each button or azimuthal bin. Further, shifts in formation impedance, e.g. due to dipping layers, can have a negligible effect on the average impedance of the formation as well, unless the dip of the formation is very high, e.g. greater than 80°.

Over a large enough interval, measurements, e.g. impedances, made by the buttons or azimuthal bins of the electromagnetic imager tool, can be expressed according to Equation 6 shown below.

$$\langle Z_i \rangle \approx \langle Z_{mudi} \rangle + \langle Z_F \rangle \quad \text{Equation 6}$$

In Equation 6, subscript i denotes the index of the buttons and "$\langle x \rangle$" denotes the expected value of x. The value x can be an applicable type of tool measurement capable of being made by the electromagnetic imager tool, however is shown as measured impedance in Equation 6. Specifically, x can be an applicable tool measurement that is capable of being made by the mud imager tool for identifying a mud angle associated with the electromagnetic imager tool.

As discussed previously, the difference between the expected values of the measured impedance between the buttons/electrodes or azimuthal bins can result from the mud contribution to the measured impedances. The mud contribution can be affected by the borehole shape, tool eccentricity, the pad geometry and pad actuation, e.g. how the pad touches the borehole wall for wireline tools, and/or borehole rugosity. It is noted that over a large enough interval, borehole rugosity effects also tend to average out. However, effects related to borehole shape, tool eccentricity (in particular for deviated in wells in LWD tools) and pad geometry (in wireline tools) may not cancel out. The goal of any mud effect removal technique, e.g. Z90, is to eliminate the contributions of the mud to the measured impedance. Accordingly, the measured impedance for the buttons, after application of a mud effect removal technique, can be represented without the mud contribution, as shown below in Equation 7.

$$\langle Z_i^{MR} \rangle \approx \langle \text{Re}\{Z_F\} \rangle \quad \text{Equation 7}$$

Here the superscript MR represents a mud removal technique. Equation 7 shows that the expected value of the measured impedances for all the electrodes/buttons or azimuthal bins should be the same after application of the mud effect removal technique to the measured impedances. In general, mud effect removal techniques return a real quantity that is proportional to the real part of the formation impedance as shown in Equation 7. However, techniques also exist where a complex quantity is returned. In those cases, the real part, the imaginary part, and/or the absolute value of the measurements, after the application of the mud effect removal technique, can be used to identify the mud angle associated with the electromagnetic imager tool. Additionally, measured impedances can be scaled by a tool constant to create processed results that are an approximation to the formation resistivity.

Figure 10:
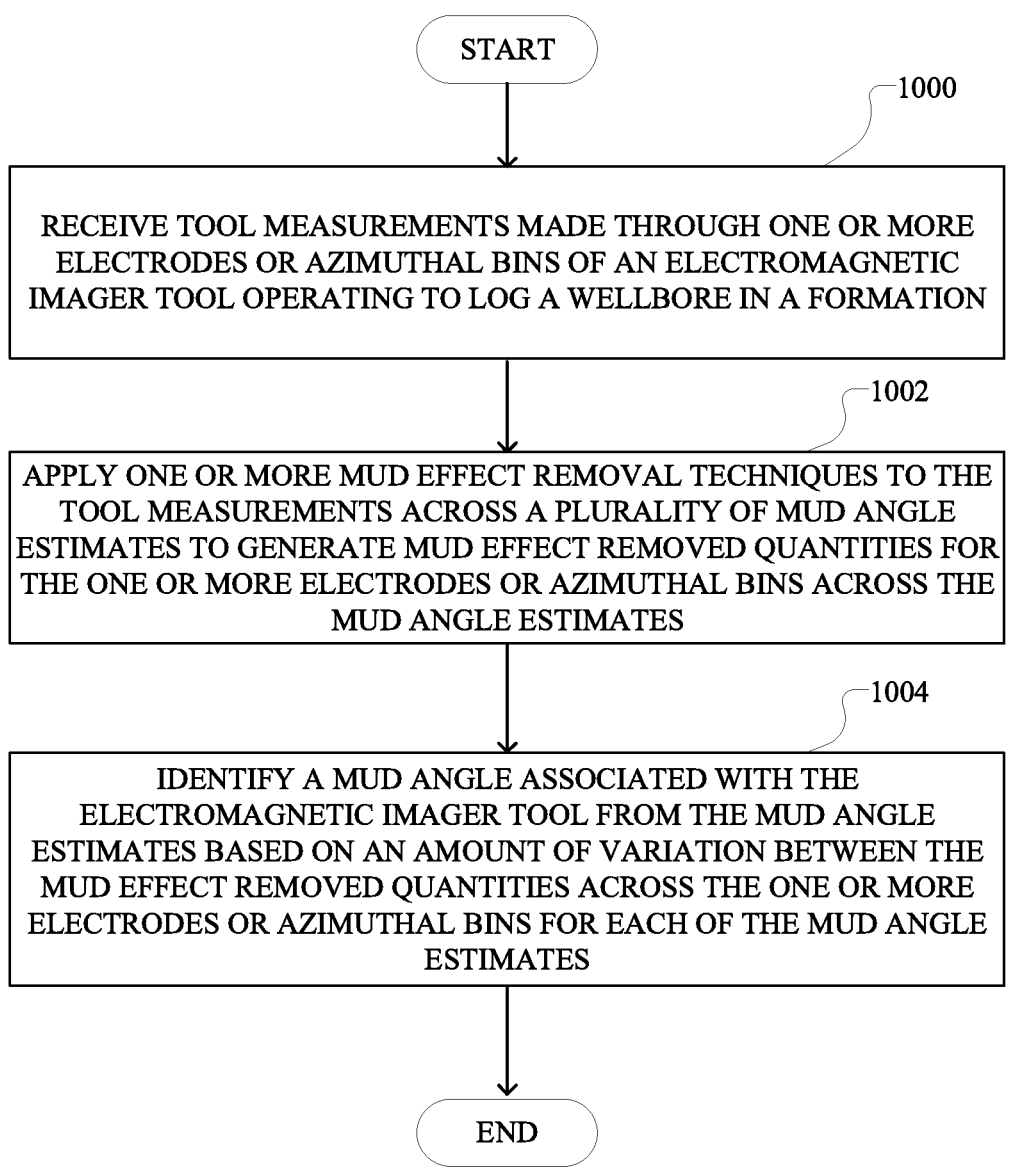
FIG. 10 illustrates a flowchart for an example method of identifying a mud angle for an electromagnetic imager tool based measurements made by the electromagnetic imager tool, in accordance with various aspects of the subject technology.

FIG. 10 illustrates a flowchart for an example method of identifying a mud angle for an electromagnetic imager tool based on mud effect removed measurements made by the electromagnetic imager tool. The method shown in FIG. 10 is provided by way of example, as there area variety of ways to carry out the method. Additionally, while the example method is illustrated with a particular order of steps, those of ordinary skill in the art will appreciate that FIG. 10 and the modules shown therein can be executed in any order and can include fewer or more modules than illustrated. Each module shown in FIG. 10 represents one or more steps, processes, methods or routines in the method.

The example method shown in the flowchart of FIG. 10 can be used to overcome the previously described deficiencies in identifying mud angle for processing techniques, e.g. the Z90 processing technique. Specifically and as will be discussed in greater detail later, an accurate estimation of a mud angle associated with the electromagnetic imager tool can be identified from measurements made by the mud imager tool operating to log a wellbore, e.g. as part of imaging a formation. This is in contrast to current techniques that inaccurately estimate mud angle of the electromagnetic imager tool. Further, the example method shown in FIG. 10 can be implemented without directly measuring the mud and instead can rely on measurements made in actually imaging the formation to estimate the mud angle. This can solve for the previously described inaccuracies in mud angle estimation through direct mud measurement. Further, this can conserve tool resources by eliminating the need to operate the electromagnetic imager tool to just make direct mud measurements instead of actually imaging the formation.

With respect to wireline tools, while the method is discussed without specificity as to what pads of the electromagnetic imager tool include the buttons/electrodes, the disclosed method can be applied on a pad by pad basis. For example, measurements, e.g. mud effect removed measurements, between different electrodes on the same pad of the electromagnetic imager tool can be compared with each other to identify the mud angle for the electromagnetic imager tool. Alternatively, the disclosed method can be applied across pads of a wireline electromagnetic imager tool. For example, measurements, e.g. mud effect removed measurements, between electrodes on different pads of the wireline electromagnetic imager tool can ultimately be compared with each other to identify the mud angle for the electromagnetic imager tool. Further, the example method shown in FIG. 10 can also be applied to LWD electromagnetic imager tools.

At step 1000, tool measurements made by the electromagnetic imager tool operating to log a wellbore are received. Specifically, the tool measurements received at step 1000 can be made as the electromagnetic imager tool operates to image a surrounding formation of the wellbore. Tool measurements made by the electromagnetic imager tool can include applicable measurements made by the electromagnetic imager tool operating to log the wellbore. The tool measurements can be made through one or more measurement units with azimuthal sensitivity of the electromagnetic imager tool. Specifically, the tool measurements can be made through one or more electrodes, e.g. button electrodes, when the electromagnetic imager tool is a wireline tool. Further, the tool measurements can be made through one or more azimuthal bins when the electromagnetic imager tool is a LWD tool.

The tool measurements made by the electromagnetic imager tool can be received as part of one or more images of the formation that are created based on measurements gathered by the electromagnetic imager tool. Specifically, the tool measurements can be received as part of one or more images of the formation that are generated by an electromagnetic imaging system associated with the electromagnetic imager tool. For example, impedance measurements made by the electromagnetic imager tool can be received from one or more images of the formation that are generated based on the impedance measurements.

In various embodiments, a calibration technique can be performed on the electromagnetic imager tool before the tool is operated to gather the tool measurements, e.g. as part of logging the wellbore. Further, a calibration technique can be performed on the electromagnetic imager tool during or after operation of the tool in gathering tool measurements. For a wireline electromagnetic imager tool, calibration can be used to remove inherent gain and phase offsets between buttons/electrodes. As a result, the buttons/electrodes can measure the same value in a homogeneous medium.

An applicable calibration technique can be utilized to calibrate the electromagnetic imager tool. For example, the electromagnetic imager tool can be operated to make measurements of a homogeneous medium in a test tank. In turn, the measurements of the homogeneous medium can be used to calibrate the electromagnetic imager tool. Further, the electromagnetic imager tool can be calibrated by attaching a calibrator device with circuit elements that have known impedances between the button(s) and the return. In turn, the electromagnetic imager tool can be operated to make measurements with the calibrator device in order to calibrate the electromagnetic imager tool. The calibrator device can conform to the surface of the electromagnetic imager tool (i.e., the pad's surface for wireline or drill collar's surface for LWD) to facilitate cooperative functioning of the calibrator device and the electromagnetic imager tool. Specifically, the calibrator device can include one or more insulating materials that surround the circuit elements and substantially cover a front face of the tool. This can minimize an impact of leakage effects when the electromagnetic imager tool is operated with the calibrator device.

At step 1002, one or more mud effect removal techniques are applied to the tool measurements across a plurality of mud angle estimates to generate mud effect removed quantities across the mud angle estimates. For example, the Z90 processing technique can be applied to the measurements received at step 1000 to generate mud effect removed quantities across the mud angle estimates. Further, the mud effect removal technique(s) can be applied to the tool measurements across the one or more electrodes or azimuthal bins to generate mud effect removed quantities for the one or more electrodes or azimuthal bins across the plurality of mud angle estimates. For example, a mud effect removal technique can be applied across mud angle estimates between −90° and 0° to a first group of impedance measurements made by a first button of a wireline electromagnetic imager tool to generate mud effect removed quantities for the first button. Further in the example, the mud effect removal technique can be applied across the mud angle estimates to a second group of impedance measurements made by a second button to generate mud effect removed quantities for the second button. In turn and as will be discussed in greater detail later, the mud effect removed quantities for the first button can be compared with the mud effect removed quantities for the second button to identify a mud angle estimate for the electromagnetic imager tool. In another example, a mud effect removal technique can be applied across mud angle estimates between −90° and 0° to impedance measurements made by a single azimuthal bin. In turn, the mud effect removed quantities for the single azimuthal bin can be compared to identify a mud angle estimate for the electromagnetic imager tool, e.g. a LWD electromagnetic imager tool.

At step 1004, a mud angle associated with the electromagnetic imager tool is identified from the plurality of mud angle estimates based on the mud effect removed quantities for the one or more electrodes or azimuthal bins of the electromagnetic imager tool. Specifically, the mud angle can be identified from the plurality of mud angle estimates based on an amount of variation between the mud effect removed quantities across the one or more electrodes or azimuthal bins for each of the mud angle estimates. For example, the amount of variation between mud effect removed quantities across two electrodes or azimuthal bins for a first mud angle estimate can be less than the amount of variation between mud effect removed quantities across the two electrodes or azimuthal bins for a second mud angle estimate. In turn, the first mud angle estimate can be identified as the mud angle associated with the electromagnetic imager tool. In another example, if the amount of variation between mud effect removed quantities for a single azimuthal bin is less for a first mud angle estimate when compared to mud effective removed quantities for a second mud angle estimate, then the first mud angle estimate can be identified as the correct mud angle for the electromagnetic imager tool.

The mud angle identified for the electromagnetic imager tool can be the mud angle that has the smallest amount of variation between the mud effect removed quantities across the one or more electrodes or azimuthal bins for the mud angle estimates. For example, if a mud angle estimate of −85° has the smallest amount of variation between the mud effect removed quantities when compared to mud effect removed quantities for other mud angle estimates, then the mud angle of −85° can be identified as the correct/accurate mud angle estimate for the electromagnetic imager tool. As discussed previously and based on the law of large numbers, the expected value of the measured impedances for the electrodes or azimuthal bins should be the same after application of the mud effect removal technique if the correct mud angle is used in the mud effect removal technique. Specifically, based on the law of large numbers, the formation contribution to the measured impedances and corresponding mud effect removed impedances should be the same across the electrodes or azimuthal bins. Accordingly, the differences between the mud effect removed impedances can be attributed to the mud effect contribution and the amount of the mud effect contribution that is not actually removed in generating the mud effect removed impedances. The amount of the mud contribution that is not actually removed from the mud effect removed impedances can be attributed to the accuracy of the mud angle applied through the mud effect removal technique. Therefore, the mud angle that leads to the smallest variation in the mud effect removed impedances across the electrodes or azimuthal bins can be the closest mud angle to the correct mud angle or can be the actual correct mud angle for the electromagnetic imager tool.

In various embodiments, a plurality of mud angles can be identified from the plurality of mud angle estimates based on an amount of variation in the mud effect removed quantities across the one or more electrodes or azimuthal bins for each of the plurality of mud angle estimates. In turn, the mud angle amongst the identified plurality of mud angles that minimizes the variation between the mud effect removed quantities across the one or more electrodes or azimuthal bins can ultimately be selected. In various embodiments, multiple estimated mud angles can minimize the variation between the mud effect removed quantities across the one or more electrodes or azimuthal bins. In turn, multiple mud angles from the estimated mud angles can be identified and one or more of the identified mud angles can be chosen based on a rule. For example, a mud angle that is closest to −90° can be selected from a plurality of estimated mud angles that minimize the variation between the mud effect removed quantities across the electrodes or azimuthal bins. The plurality of mud angles identified from the plurality of mud angle estimates based on an amount of variation between the mud effect removed quantities can form a range of mud angles. Further, the plurality of mud angles can include a subset of mud angle estimates that are physically reasonable, e.g. actually capable of being achieved in the mud. For example, the plurality of mud angles can be located in the fourth quadrant of the complex plane, e.g. −90° to 0°.

One or more mud angles identified from the plurality of mud angle estimates based on an amount of variation between mud effect removed quantities can be processed using an applicable technique that utilizes mud angles associated with the electromagnetic imager tool. For example, a mud effect removal process, e.g. Z90 processing, can be applied to one or more images based on the identified mud angle to remove the mud effect from the one or more images. This can improve both quality and contrast in the images, particularly in areas of the image affected by the mud effect. Additionally, the one or more mud angles identified from the plurality of mud angle estimates can be returned to a user, e.g. along with one or more processed images. The user can use the returned mud angle(s) in applying further processing, such as application of an advanced inversion to identify other mud and formation parameters/properties. In turn, this can reduce amounts of time and computational resources used in applying the advanced inversion. For a multi-frequency tool, measurements for each frequency may be treated independently in the manner described above to determine the mud angle at each frequency.

The mud effect removed quantities can be averaged before the mud angle is identified from the mud effect removed quantities based on variation in the mud effect removed quantities. Specifically, the mud effect removed quantities can be averaged to generate averaged mud effect removed quantities for the plurality of mud angle estimates. In turn, the mud angle can be selected from the plurality of mud angle estimates based on the variation between the averaged mud effect removed quantities. The mud effect removed quantities can be averaged on a per-electrode or per azimuthal bin basis to generate averaged mud effect removed quantities for each electrode/azimuthal bin at each of the plurality of mud angle estimates. As follows, the averaged mud effect removed quantities for each electrode/azimuthal bin can be compared with each other to identify the mud angle from the plurality of mud angle estimates based on the variation of the mud effect removed quantities. Specifically, the amount of variation between the averaged mud effect removed quantities for each electrode/azimuthal bin, e.g. the minimum amount of variation between averaged mud effect removed quantities across the electrodes/azimuthal bins, can be used as the basis for identifying the mud angle of the electromagnetic imager tool. For example, if a mud angle estimate has the smallest amount of variation between averaged impedance measurements across the electrodes/azimuthal bins, then the mud angle estimate can be identified as the mud angle for the electromagnetic imager tool.

The amount of variation between the mud effect removed quantities across the electrodes/azimuthal bins can be identified using an applicable technique for measuring variation between quantities. Specifically, the amount of variation between the mud effect removed quantities across the two or more electrodes/azimuthal bins can be identified based on a standard deviation of the mud effect removed quantities across the two or more electrodes. More specifically, the amount of variation between the mud effect removed quantities for each of the plurality of mud angle estimates can be identified based on a standard deviation of the mud effect removed quantities across the electrodes/azimuthal bins for each of the plurality of mud angle estimates.

Equation 8 shows how the mud angle for the electromagnetic imager tool can be identified based on the standard deviation of the mud effect removed quantities across the electrodes/azimuthal bins.

$$\arg_{\tilde{\varphi}_M} \min[\sigma(\langle \tilde{Z}_i^{MR} \rangle)] \quad \text{Equation 8}$$

In Equation 8, σ denotes the standard deviation and $\varphi_M$ denotes the mud angle. The tilde over the mud angle is meant to represent that mud angle is a guess for the mud angle/an estimated mud angle among a range of possible mud angles. Similarly, tilde over the impedance (Z) is meant to represent that the mud removal algorithm is applied using the corresponding mud angle guess. Thus, this equation signifies that the mud angle that minimizes the standard deviation of the results obtained after application of the mud removal technique to the measurements will be identified as the mud angle for the electromagnetic imager tool.

Alternatively, the mud angle can be identified based on the standard deviation of the mud effect removed quantities without an expected value operation, as is opposed to the standard deviation-based technique shown in Equation 8. Specifically, the mud angle can be identified based on standard deviation without an expected value operation, as shown in Equation 9.

$$\arg_{\tilde{\varphi}_M} \min[\sigma(\tilde{Z}_i^{MR})] \quad \text{Equation 9}$$

In this technique, the mud angle that minimizes the variation within the selected measurements would also reduce the variation between individual buttons/azimuthal bins and is therefore selected as the mud angle for the electromagnetic imager tool. Before, application of the technique shown in Equation 9, 2-D image data generated based on the measurements gathered by the electromagnetic imager tool can be flattened into a vector to apply the standard deviation over the mud effect removed quantities.

Further, the mud effect removed quantities can be normalized before the mud angle is identified from the mud effect removed quantities based on variation. Equation 10 shows a technique for identifying the mud angle from the plurality of mud angle estimates based on an amount of variation between normalized mud effect removed quantities.

$$\arg_{\tilde{\varphi}_M} \min\left[\sigma\left(\frac{\langle \tilde{Z}_i^{MR} \rangle}{\langle\langle \tilde{Z}_i^{MR} \rangle\rangle}\right)\right] \quad \text{Equation 10}$$

The mud effect removed quantities can be normalized with an applicable quantity to generate the normalized mud effect removed quantities. Specifically, the mud effect removed quantities can be normalized with the averaged mud effect removed quantities to generate the normalized mud effect removed quantities. For example, mud effect removed impedances averaged over depth for each electrode/azimuthal bin can be normalized with the corresponding mud effect removed impedance further averaged over electrodes/azimuthal bins (i.e., average of averages) to generate normalized average mud effect removed impedances for each electrode/azimuthal bin. In turn, the mud angle can be selected based on the amount of variation in the normalized mud effect removed impedances across the electrodes/azimuthal bins.

Additionally, the mud effect removed quantities can be constrained before the mud angle is identified from the mud effect removed quantities based on variation in the mud effect removed quantities. Specifically, the mud effect removed quantities can be constrained with one or more constraining quantities to generate constrained mud effect removed quantities. In turn, the mud angle can be identified from the plurality of mud angle estimates based on an amount of variation between the constrained mud effect removed quantities across the electrodes for each of the mud angle estimates.

The one or more constraining quantities can be set based on the tool measurements made by the electromagnetic imager tool through the electrodes. Specifically, a constraint can be added to minimize the difference between mud effect removed results and results from the button or azimuthal bin that exhibits the minimum mud effect before any mud removal. More specifically, the minimum average tool measurement response of one of the electrodes or azimuthal binds can serve as the constraining quantity for the mud effect removed quantities. For example, if a first electrode of a wireline electromagnetic imager tool has the smallest average impedance measurement of the other electrodes of the electromagnetic imager tool, then the constraining quantity can be set based on the average impedance measurement of the first electrode. This technique is shown in Equation 11.

$$\arg_{\tilde{\varphi}_M}\min[\sigma(\langle \tilde{Z}_i^{MR} \rangle)+\lambda\|(\langle \tilde{Z}_i^{MR} \rangle -\min\{\langle \text{Re}\{\tilde{Z}_{ij}\}\rangle\})\|] \quad \text{Equation 11}$$

As shown in Equation 11, the mud removed quantities are assumed to be real. Further, λ in Equation 11 represents a regularization constant that can be tool and/or implementation dependent.

Further, the one or more constraining quantities can be set based on an expected value for resistivity, as shown in Equation 12. In Equation 12, the expected resistivity value is denoted as p.

$$\arg_{\tilde{\varphi}_M} \min \lfloor \sigma(\langle \tilde{Z}_i^{MR} \rangle) + \lambda \|(\langle \tilde{Z}_i^{MR} \rangle - \rho \times TC)\| \rfloor \qquad \text{Equation 12}$$

The expected resistivity value can be a constant that is multiplied by the minimum value used in Equation 12. Further, the expected resistivity can be obtained from a reference resistivity tool or identified based on measurement(s) made by another applicable multi-frequency tool associated with the electromagnetic imager tool. For example, the expected resistivity can be based on measurements generated by the multi-frequency tool operating at a higher frequency, e g than the operating frequency of the electromagnetic imager tool. Alternatively, the expected resistivity can be manually set by an operator of the electromagnetic imager tool.

Additionally, only tool measurements and corresponding mud effect removed quantities that produce positive resistivities or resistivities of a certain value with respect to a threshold value can be used in the technique shown in Equation 12. For example, only tool measurements and corresponding mud effect removed quantities that produce resistivities above a minimum threshold value can be used in the technique shown in Equation 12. This is shown in Equation 13 where Thres represents a threshold value.

$$\arg_{\tilde{\varphi}_M} \min \{ \lfloor \sigma(\langle \tilde{Z}_i^{MR} \rangle) \rfloor ; \langle \tilde{Z}_i^{MR} \rangle > \text{Thres} \} \qquad \text{Equation 11}$$

While the techniques shown in Equations 12 and 13 are discussed with respect to resistivity, an applicable quantity, e.g. a quantity capable of being measured by the electromagnetic imager tool, can be used in place of the expected value of resistivity as a basis for the one or more constraining quantities. Further, the techniques shown in Equations 10-13 can be applied based on the standard deviation of the mud effect removed quantities without an expected value operation, similar to the technique shown in Equation 9. Additionally, the techniques shown in Equations 9-13 can be applied based on either averaged mud effect removed quantities or medians of the mud effect removed quantities. For example, while the technique shown in Equation 11 is discussed with respect to averaged mud effect removed quantities, the mud effect removed quantities can be constrained based on the median mud effect removed quantities at each electrode.

In various embodiments, the tool measurements used in identifying the mud angle can be a subset of a plurality of tool measurements, e.g. a total number of tool measurements, made by the electromagnetic imager tool. Specifically, the tool measurements can be selected from the plurality of tool measurements and subsequently used in identifying the mud angle for the tool according to the techniques described herein. The tool measurements can be selected based on strengths of the mud effect in the tool measurements. More specifically, tool measurements made in formation regions that are susceptible to the mud effect, e.g. have low formation resistivities, can be selected and used to identify the mud angle associated with the electromagnetic imager tool. For example, if a low mud effect is observed in a first subset of tool measurements and a high mud effect is observed in a second subset of tool measurements, then the second subset of tool measurements can be selected and applied in the techniques described herein to identify the mud angle of the electromagnetic imager tool.

In selecting different tool measurements from a plurality of tool measurements made by the electromagnetic imager tool, different zones/regions in images created based on the tool measurements can be selected. For example, zones that exhibit strong mud effect in one or more images created based on measurements made by the electromagnetic imager tool can be selected. In turn, the measurements from the selected zones can applied in the techniques described herein to identify the mud angle of the electromagnetic imager tool. A zone can be a portion of an image generated based on measurements made by the electromagnetic imager tool that corresponds to a specific region in the measured formation. However for simplicity purposes, the terms "zone" and "region" are used interchangeably throughout this disclosure.

The tool measurements can be selected from the plurality of tool measurements based on characteristics of the tool measurements grouped into specific zones/regions. Specifically, the tool measurements can be selected based on variations in the characteristics of the tool measurements grouped into specific zones. An indicator of the variation of the signal can be calculated for each zone, especially when multiple zones are selected. In turn, tool measurements can be selected from the zones having the lowest signal variation within the zones. Further, when multiple zones and corresponding tool measurements are selected a mud angle of the electromagnetic imager tool can be found for each zone. In turn, an interpolation technique can be used to find the mud angle in between zones. Specifically, a mud angle value that varies with depth of the formation can be identified. Furthermore, a smoothing filter can be applied to the results to reduce the noise.

A blob detection technique can be applied to the plurality of tool measurements to select the subset of tool measurements for identifying the mud angle associated with the electromagnetic imager tool. Specifically, cavings or washouts on a wall of the wellbore can lead to increased mud effect in the tool measurements. A blob detection technique can be applied to the tool measurements to identify the cavings and subsequently select the tool measurements associated with the cavings. Specifically, cavings can be detected from the tool measurements by identifying contiguous buttons/electrodes (or azimuthal bins for LWD imagers) with large absolute impedances over a depth interval. More specifically, a measurement/image interval continuous in depth and azimuth, e.g. across electrodes or azimuthal bins, with a large absolute impedance can indicate a caving. Accordingly, an applicable blob detection technique, such as the Laplacian of the Gaussian technique, can identify the cavings based on the absolute impedances of the tool measurements. In turn, measurements associated with the detected cavings, e.g. measurements of electrodes in front of the detected cavings, can be selected and used to identify the mud angle of the electromagnetic imager tool according to the techniques described herein.

Further, an edge detection technique, such as the Canny edge detector, can be applied to the plurality of tool measurements to select the subset of tool measurements for identifying the mud angle of the electromagnetic imager tool. Specifically, an edge detection technique can be applied to the measured impedances to find different formation regions of the imaged formation. As follows, measurements corresponding to the different formation regions can be selected based on characteristics of the formation regions/measurements. For example, regions, and corresponding measurements, with low absolute impedances can be selected for identifying the mud angle of the electromagnetic imager tool. In particular, identified regions can be sorted based on average or median absolute measurements, impedances, for selecting the tool measurements. Thresholds and/or absolute values can be used to determine low resistivity regions through application of an edge detection technique. In turn, measurements in regions with the lowest average resistivity, e.g. compared to a threshold, can be selected. Alternatively, a specific number of low resistivity regions can be selected.

Further, regions can be selected based on thicknesses of the regions as part of selecting the tool measurements form a plurality of tool measurements. For example, measurements in a low resistivity region with a large thickness can be selected from the plurality of tool measurements. Selecting regions and corresponding measurements based on region thickness can ensure that the techniques described herein are applied to a large enough number of depth samples to satisfy the law of large numbers.

The tool measurements can be selected from a plurality of tool measurements based on absolute values of the tool measurements. Further, the tool measurements can be selected from the plurality of tool measurements using a histogram. Specifically, the tool measurements can be selected based on a histogram of absolute values of the tool measurements. Using absolute values of the tool measurements to select the tool measurements can be more beneficial than using the real part of the tool measurements if exact cutoffs are irrelevant, e.g. where calibration is believed to be inadequate. In turn, the measurements selected based on the histogram of absolute values can further be filtered to select measurements with relatively lower absolute impedance values. For example, the impedance measurements in the lowest 25% of impedances can be filtered out from the measurements selected using the histogram of absolute values. In order to further simplify calculations, these filtered measurements can be reduced even more by randomly/pseudo-randomly selecting measurements from these filtered measurements. In various embodiments, the threshold of the lowest 25% of impedances can be undesirable due to noise or other applicable effects, such as the tool body effect. Accordingly, the measurements can have very low sensitivities to the formation. As a result, a lower threshold of absolute impedances can be applied, e.g. a threshold between 5% and 25% may be used.

Further, tool measurements can be selected from a plurality of tool measurements based on either or both real values and imaginary values of the tool measurements. Real parts of the measurements can be scaled by a tool constant to give apparent resistivity values. Further, measurements that exhibit strong mud effect can also have sensitivity to the formation based on expected standoff variations of the tool. In turn, these measurements can be selected.

Tool measurements can also be selected from a plurality of tool measurements manually by an operator. Specifically, an operator can manually select the tool measurements from the plurality of tool measurements by visually inspecting the plurality of tool measurements and/or one or more images generated from the plurality of tool measurements. For example, an operator can select regions in an image log that have low resistivities and show the mud effect. An operator can also use data from other applicable tools to select the tool measurements from the plurality of tool measurements. In particular, an operator can use data from other tools that logged the formation to select the tool measurements from the plurality of tool measurements. For example, an operator can use formation results created through a multi-component induction tool or an array laterolog tool to select the tool measurements from the plurality of tool measurements. Alternatively, an operator does not actually select the tool measurements using other tools, but instead the process of selecting the tool measurements based on measurements made by other tools is automated. For example, tool measurements can automatically be selected for formation regions that have low resistivities, as measured by other tools.

Additionally, tool measurements can be selected based on assigned quality indicators to the tool measurements or regions including the tool measurements. For example, a formation region can have high expected resistivities, e.g. as identified by other tools. As a result, the region can be assigned a low quality indicator and tool measurements in these regions can be excluded from the selected tool measurements, e.g. based on the low quality indicator. Further, tool measurements can be selected based on noise levels in the tool measurements. Specifically, the tool measurements can be assigned a quality indicator based on the noise levels in the tool measurements. Subsequently, the tool measurements can be selected if the noise levels are low in the measurements, e.g. as indicated by the quality indicator assigned to the measurements. Noise levels in the measurements can be determined using an applicable technique. For example, changes in a signal for measurements in proximity to each other can be used to determine noise levels in the measurements.

While the disclosure has described selecting a subset of tool measurements made by the electromagnetic imager tool to identify the mud angle, a subset of mud angle estimates can also be selected for identifying the mud angle of the electromagnetic imager tool. Specifically, the plurality of mud angle estimates applied according to the techniques described herein can be a subset of a larger group of mud angle estimates. The mud angle estimates can be selected from the larger group of mud angle estimates for application in identifying the mud angle of the electromagnetic imager tool. Specifically, the mud angle estimates can be selected from the larger group of mud angle estimates based on values of the mud effect removed quantities generated through application of the larger group of mud angle estimates. More specifically, the mud angle estimates can be selected from the larger group of mud angle estimates based on values of the generated mud effect removed quantities with respect to one or more thresholds. For example, a first group of mud angle estimates can lead to mud effect removed impedances that are above a threshold impedance level for the mud effect removed quantities. In turn, the first group of mud angle estimates can be excluded from the mud angle estimates that are ultimately used to identify the mud angle of the electromagnetic imager tool.

Further, the one or more electrodes or azimuthal bins, e.g. for a LWD tool, used in identifying the mud angle of the electromagnetic imager tool can be a subset of a total number of electrodes/buttons of the electromagnetic imager tool. In turn, measurements generated from the subset of electrodes or azimuthal bins can be used to identify the mud angle, while the measurements generated from the other electrodes or azimuthal bins outside of the subset are not used to identify the mud angle. For example, two buttons out of ten buttons on a pad can be selected and subsequently used to identify the mud angle of a wireline electromagnetic imager tool while measurements made by the remaining buttons are not used to identify the mud angle. In wireline imager tools, the electrodes selected for identifying the mud angle can be selected based on either or both noise levels in corresponding measurements made by the electrodes and expected sensitivities of the electrodes to mud. For example, if an electrode produces measurements with low noise levels, then the electrode can be used in identifying the mud angle of the electromagnetic imager tool.

The one or more electrodes or azimuthal bins selected for identifying the mud angle can also be selected based on variations in tool measurements made through the one or more electrodes or azimuthal bins. Specifically, the one or more electrodes or azimuthal bins can be selected based on variations amongst the average tool responses of the one or more electrodes or azimuthal bins. For example, a subset of one or more electrodes or azimuthal bins that have a large contrast of average impedances, e.g. compared to a threshold, can be used in finding the mud angle through the techniques described herein. Further, buttons that are included in pads that lost contact with the formation during operation of the electromagnetic imager tool can also be selected in a wireline imager tool. Specifically, buttons that lost contact with the formation can be detected using an edge detection technique applied to measurements generated by the buttons. In turn, the measurements of the buttons that lost contact with the formation, e.g. the measurements made when the buttons lost contact with the formation, can be used to identify the mud angle of the wireline electromagnetic imager tool.

Figure 11:
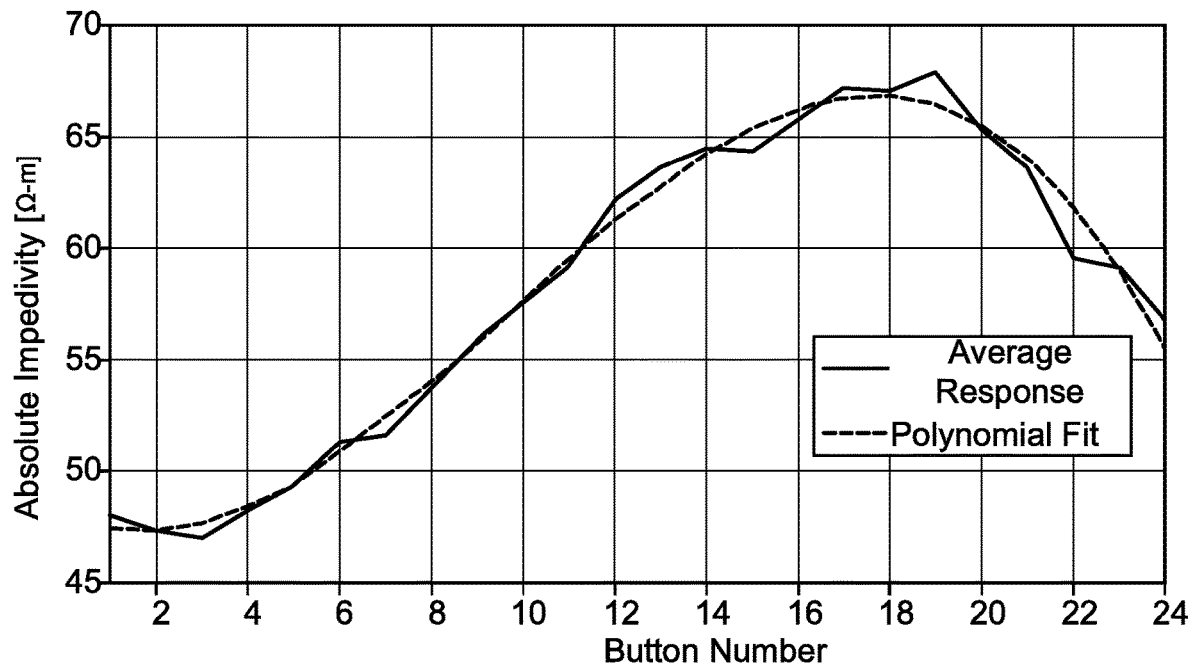
FIG. 11 is a plot of average responses of buttons for a pad of the electromagnetic imager tool, in accordance with various aspects of the subject technology.

FIG. 11 is a plot of average responses of buttons for a pad of a wireline electromagnetic imager tool. As shown in FIG. 11, button 11 and button 22 have very similar responses and can therefore be unsuitable for identifying the mud angle through the techniques described herein. Specifically, buttons that have different responses can be selected for identifying the mud angle of the electromagnetic imager tool. Further, as shown in the plot in FIG. 11, a polynomial fit can be applied to the responses across the electrodes. The polynomial fit can be used in finding noisy buttons whose average response deviates significantly from the fit. Further, the polynomial fit can be used to select buttons that have contrasting average tool responses. The polynomial fit can be applied iteratively to reduce the effect of noisy buttons by not using the buttons that deviate significantly from the fit in the next iteration. Further, the polynomial fit can be generated by excluding buttons with a very high depth variation.

Thresholds for selecting one or a combination of the tool measurements, the mud angle estimates, and the one or more electrodes or azimuthal bins used in identifying the mud angle of the electromagnetic imager tool can change based on operating frequency of the electromagnetic imager tool. In turn, the tool measurements, the mud angle estimates, and/or the one or more electrodes or azimuthal bins can be selected based on an operating frequency of the electromagnetic imager tool in making the tool measurements. Further, thresholds can be specific to different formation types. In turn, the thresholds can be selected and applied based on the type of formation that is imaged. Thresholds for selecting the tool measurements, the mud angle estimates, and/or the one or more electrodes or azimuthal bins can be determined and modified by an operator. Specifically, an operator can set thresholds based on a visualization of data.

Figure 12:
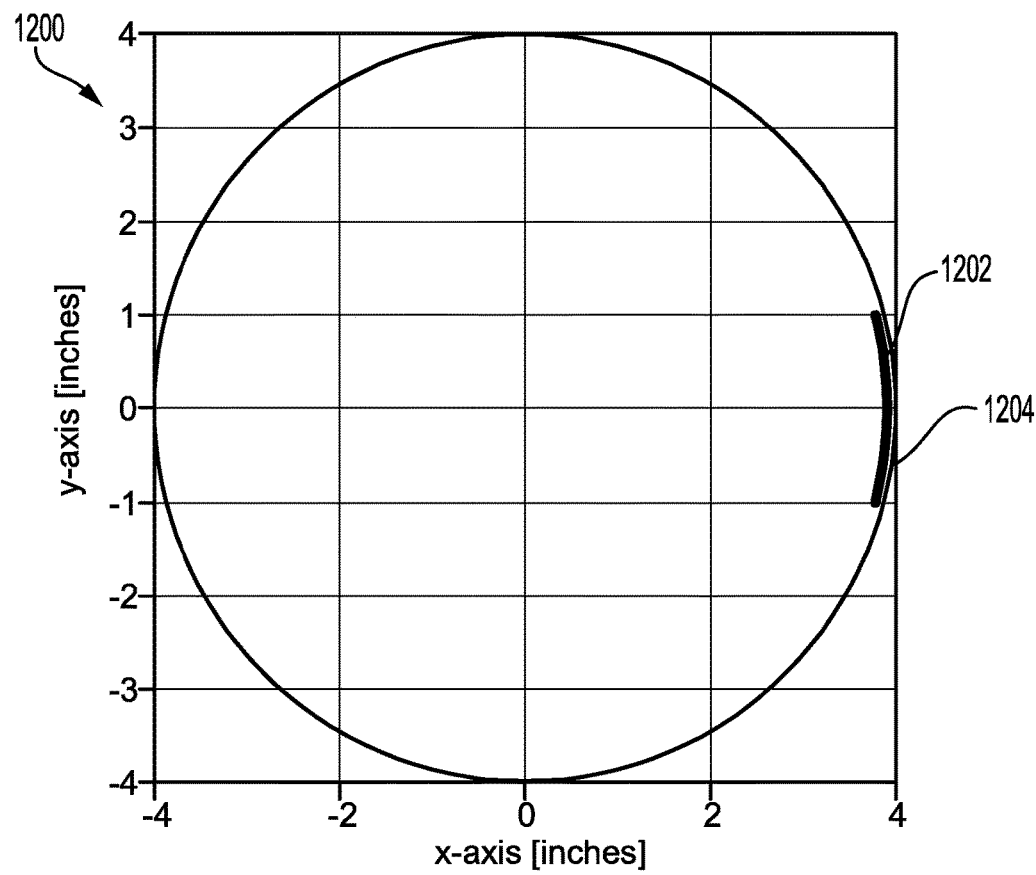
FIG. 12 is a diagram illustrating the position of the pad with respect to the borehole in the example simulation, in accordance with various aspects of the subject technology.
Figure 13:
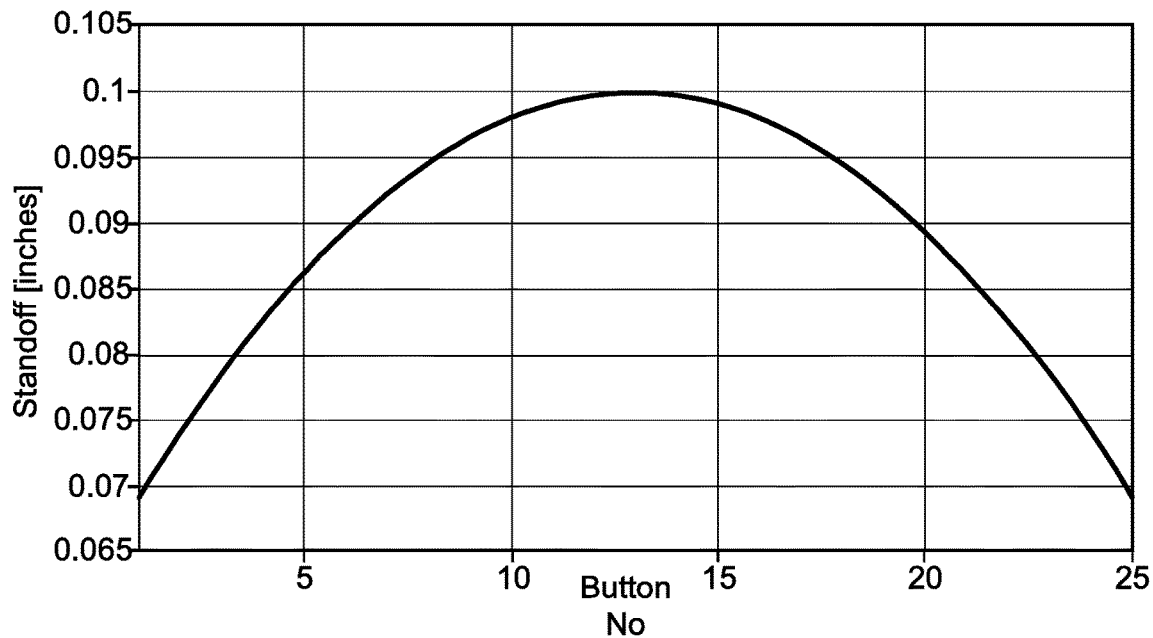
FIG. 13 is a plot of the standoff profile of the buttons on the pad in the example simulation, in accordance with various aspects of the subject technology.

The disclosure now continues with a discussion of a simulation of detecting the mud angle for an example wireline electromagnetic imager tool according to the techniques described herein. The simulation was performed for a pad with 25 buttons/electrodes and a radius of curvature of 5 inches. The simulation was performed for the pad in a borehole having a diameter of 8 inches. FIG. 12 is a diagram 1200 illustrating the position of the pad with respect to the borehole in the example simulation. The position of the pad 1202 is shown with respect to the borehole wall 1204, assuming that the pad is centered in the borehole and the center button has a standoff of 0.1 inches. FIG. 13 is a plot of the standoff profile of the buttons on the pad in the example simulation. The standoff profile shown in FIG. 13 assumes a perfect borehole wall with no rugosity of the borehole wall.

A Monte Carlo type simulation was performed where the standoff and formation resistivities were chosen as random variables with a uniform distribution. Further, the simulation was performed with the same mud properties and formation permittivities that were used to generate the results shown in FIGS. 8-9. Standoff for each button was varied randomly around the profile shown in FIG. 13 from 0 standoff to 2 times the mean standoff, and formation resistivity was changed between 0.02 Ω-m to 1.8 Ω-m. Then, using the impedances obtained from the Monte Carlo simulation and Equation 8, the mud angle that minimized the standard deviation of the Z90 processed impedances of individual buttons among the mud angle values in the fourth quadrant of the complex plane (i.e., between −90° and 0°) was found.

Figure 14:
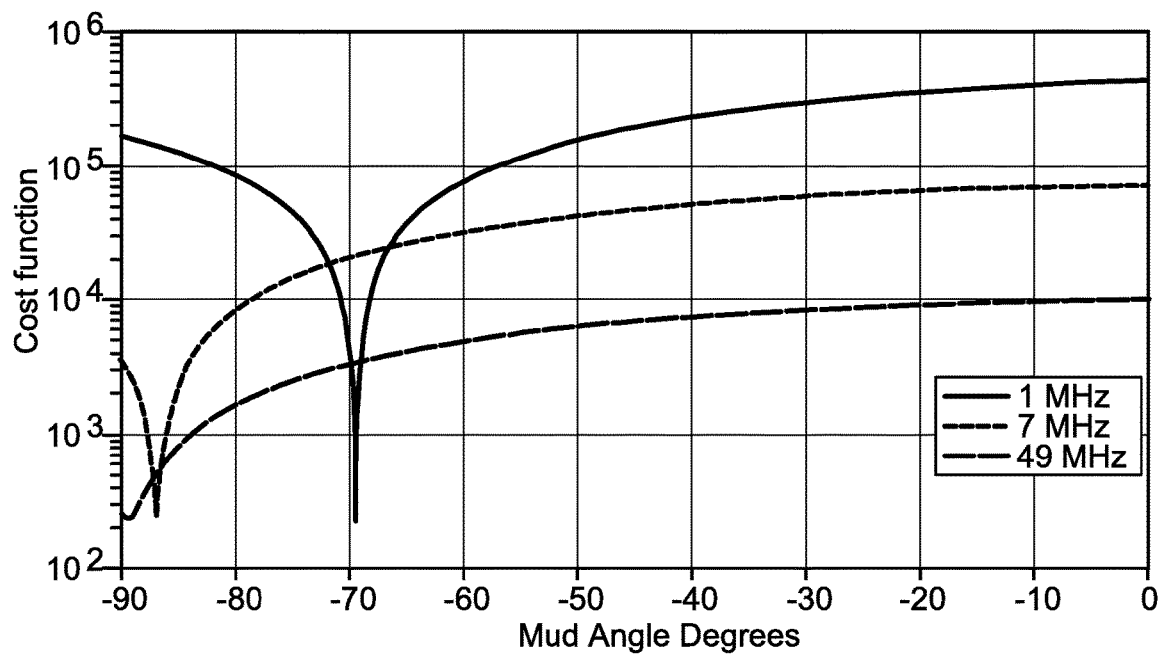
FIG. 14 is a plot of the change of the value that is minimized in Equation 8 with the mud angle, denoted as the cost function, with respect to the estimated mud angles, in accordance with various aspects of the subject technology.

FIG. 14 is a plot of the change of the value that is minimized in Equation 8 with the mud angle, denoted as the cost function, with respect to the estimated mud angles. The mud angles that minimize the cost function for different frequencies are tabulated in Table 3.

TABLE 3

| 1 MHz | 7 MHz | 49 MHz |
|---|---|---|
| −69.46° | −86.93° | −89.55° |

A brute force search with a spacing of 0.01° was used to produce the plot shown in FIG. 12. Therefore, the results of Table 3 are only valid to an accuracy of 0.005°; note that the change of the cost function versus the mud angle is well behaved precluding a larger error than 0.005°. That said, more complicated solution techniques can be employed as mentioned before to calculate the mud angle that minimize Equation 8, including interpolating the results, fine tuning the results around the final result by performing a finer search, and performing an inversion.

Figure 15:
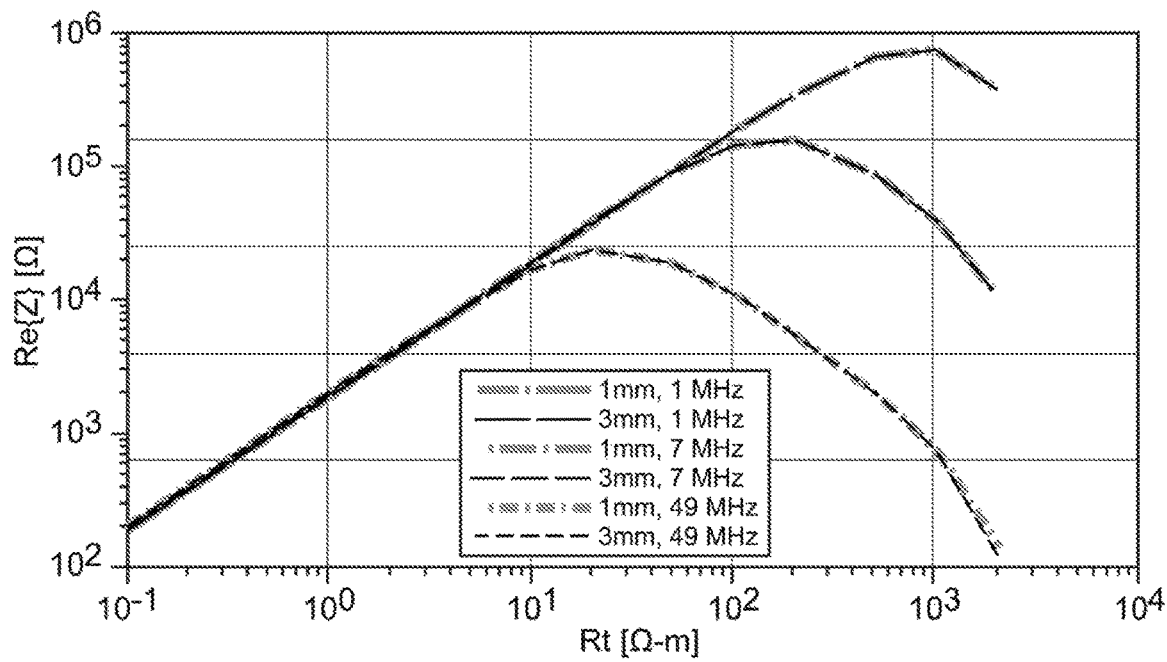
FIG. 15 is a plot of real parts of simulated impedances versus simulated formation resistivities $R_t$ after Z90 processing is performed using the mud angles identified through the example simulation, in accordance with various aspects of the subject technology.

It can be seen from Table 3 that the computed mud angles are very close to true values. It should again be reminded that this demonstration was based on an approximate circuit model of the tool which does not contain noise, although standoff and formation resistivity was randomly varied. Nevertheless, it illustrates the application and accuracy of the techniques described herein. FIG. 15 is a plot of real parts of simulated impedances versus simulated formation resistivities $R_t$ after Z90 processing is performed using the mud angles identified through the example simulation. These results are very close to the ideal case shown in FIG. 8.

Figure 16:
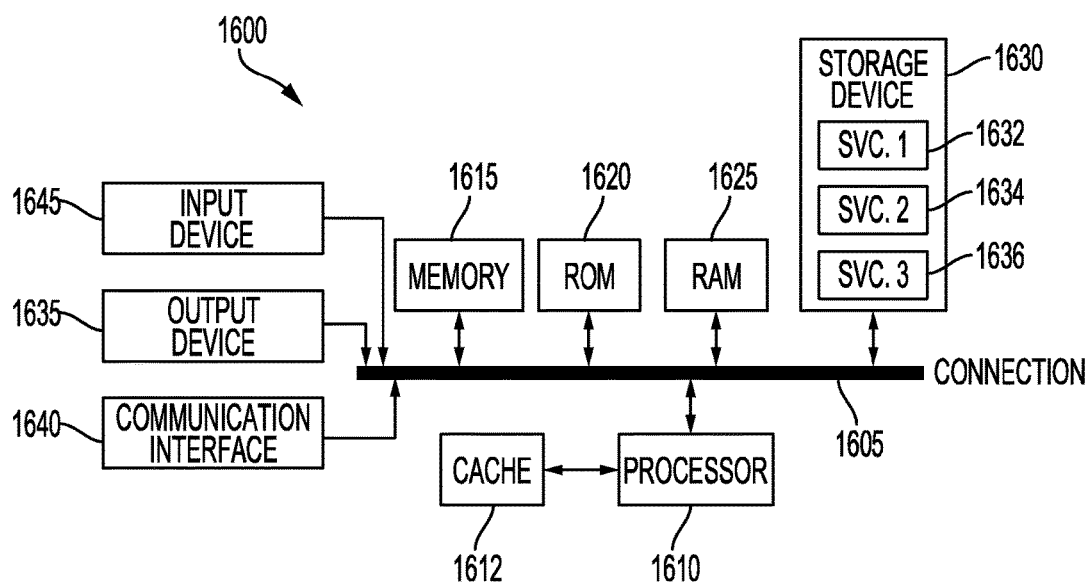
FIG. 16 illustrates an example computing device architecture which can be employed to perform various steps, methods, and techniques disclosed herein.

FIG. 16 illustrates an example computing device architecture 1600 which can be employed to perform various steps, methods, and techniques disclosed herein. Specifically, the computing device architecture can be integrated with the electromagnetic imager tools described herein. Further, the computing device can be configured to implement the techniques of identifying a mud angle associated with an electromagnetic imager tool described herein.

As noted above, FIG. 16 illustrates an example computing device architecture 1600 of a computing device which can implement the various technologies and techniques described herein. The components of the computing device architecture 1600 are shown in electrical communication with each other using a connection 1605, such as a bus. The example computing device architecture 1600 includes a processing unit (CPU or processor) 1610 and a computing device connection 1605 that couples various computing device components including the computing device memory 1615, such as read only memory (ROM) 1620 and random access memory (RAM) 1625, to the processor 1610.

The computing device architecture 1600 can include a cache of high-speed memory connected directly with, in close proximity to, or integrated as part of the processor 1610. The computing device architecture 1600 can copy data from the memory 1615 and/or the storage device 1630 to the cache 1612 for quick access by the processor 1610. In this way, the cache can provide a performance boost that avoids processor 1610 delays while waiting for data. These and other modules can control or be configured to control the processor 1610 to perform various actions. Other computing device memory 1615 may be available for use as well. The memory 1615 can include multiple different types of memory with different performance characteristics. The processor 1610 can include any general purpose processor and a hardware or software service, such as service 1 1632, service 2 1634, and service 3 1636 stored in storage device 1630, configured to control the processor 1610 as well as a special-purpose processor where software instructions are incorporated into the processor design. The processor 1610 may be a self-contained system, containing multiple cores or processors, a bus, memory controller, cache, etc. A multi-core processor may be symmetric or asymmetric.

To enable user interaction with the computing device architecture 1600, an input device 1645 can represent any number of input mechanisms, such as a microphone for speech, a touch-sensitive screen for gesture or graphical input, keyboard, mouse, motion input, speech and so forth. An output device 1635 can also be one or more of a number of output mechanisms known to those of skill in the art, such as a display, projector, television, speaker device, etc. In some instances, multimodal computing devices can enable a user to provide multiple types of input to communicate with the computing device architecture 1600. The communications interface 1640 can generally govern and manage the user input and computing device output. There is no restriction on operating on any particular hardware arrangement and therefore the basic features here may easily be substituted for improved hardware or firmware arrangements as they are developed.

Storage device 1630 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 1625, read only memory (ROM) 1620, and hybrids thereof. The storage device 1630 can include services 1632, 1634, 1636 for controlling the processor 1610. Other hardware or software modules are contemplated. The storage device 1630 can be connected to the computing device connection 1605. In one aspect, a hardware module that performs a particular function can include the software component stored in a computer-readable medium in connection with the necessary hardware components, such as the processor 1610, connection 1605, output device 1635, and so forth, to carry out the function.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can include hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific embodiments thereof, but those skilled in the art will recognize that the application is not limited thereto. Thus, while illustrative embodiments of the application have been described in detail herein, it is to be understood that the disclosed concepts may be otherwise variously embodied and employed, and that the appended claims are intended to be construed to include such variations, except as limited by the prior art. Various features and aspects of the above-described subject matter may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The various illustrative logical blocks, modules, circuits, and algorithm steps described in connection with the examples disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the method, algorithms, and/or operations described above. The computer-readable data storage medium may form part of a computer program product, which may include packaging materials.

The computer-readable medium may include memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

Other embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

In the above description, terms such as "upper," "upward," "lower," "downward," "above," "below," "downhole," "uphole," "longitudinal," "lateral," and the like, as used herein, shall mean in relation to the bottom or furthest extent of the surrounding wellbore even though the wellbore or portions of it may be deviated or horizontal. Correspondingly, the transverse, axial, lateral, longitudinal, radial, etc., orientations shall mean orientations relative to the orientation of the wellbore or tool. Additionally, the illustrate embodiments are illustrated such that the orientation is such that the right-hand side is downhole compared to the left-hand side.

The term "coupled" is defined as connected, whether directly or indirectly through intervening components, and is not necessarily limited to physical connections. The connection can be such that the objects are permanently connected or releasably connected. The term "outside" refers to a region that is beyond the outermost confines of a physical object. The term "inside" indicates that at least a portion of a region is partially contained within a boundary formed by the object. The term "substantially" is defined to be essentially conforming to the particular dimension, shape or another word that substantially modifies, such that the component need not be exact. For example, substantially cylindrical means that the object resembles a cylinder, but can have one or more deviations from a true cylinder.

The term "radially" means substantially in a direction along a radius of the object, or having a directional component in a direction along a radius of the object, even if the object is not exactly circular or cylindrical. The term "axially" means substantially along a direction of the axis of the object. If not specified, the term axially is such that it refers to the longer axis of the object.

Although a variety of information was used to explain aspects within the scope of the appended claims, no limitation of the claims should be implied based on particular features or arrangements, as one of ordinary skill would be able to derive a wide variety of implementations. Further and although some subject matter may have been described in language specific to structural features and/or method steps, it is to be understood that the subject matter defined in the appended claims is not necessarily limited to these described features or acts. Such functionality can be distributed differently or performed in components other than those identified herein. The described features and steps are disclosed as possible components of systems and methods within the scope of the appended claims.

Moreover, claim language reciting "at least one of" a set indicates that one member of the set or multiple members of the set satisfy the claim. For example, claim language reciting "at least one of A and B" means A, B, or A and B.

Statements of the disclosure include:

A method comprising receiving tool measurements made through one or more measurement units with azimuthal sensitivity of an electromagnetic imager tool operating to log a wellbore in a formation. One or more mud effect removal techniques can be applied to the tool measurements across a plurality of mud angle estimates to generate mud effect removed quantities for the one or more measurement units across the plurality of mud angle estimates. A mud angle associated with the electromagnetic imager tool can be identified from the plurality of mud angle estimates based on an amount of variation between the mud effect removed quantities across the one or more measurement units for each of the plurality of mud angle estimates.

A system comprising one or more processors and at least one computer-readable storage medium having stored therein instructions. The instructions which, when executed by the one or more processors, cause the one or more processors to perform operations comprising receiving tool measurements made through one or more measurement units with azimuthal sensitivity of an electromagnetic imager tool operating to log a wellbore in a formation. Further, the instructions can cause the one or more processors to apply one or more mud effect removal techniques to the tool measurements across a plurality of mud angle estimates to generate mud effect removed quantities for the one or more measurement units across the plurality of mud angle estimates. Additionally, the instructions can cause the one or more processors to identify a mud angle associated with the electromagnetic imager tool from the plurality of mud angle estimates based on an amount of variation between the mud effect removed quantities across the one or more measurement units for each of the plurality of mud angle estimates.

A non-transitory computer-readable storage medium having stored therein instructions which, when executed by a processor, cause the processor to perform operations comprising receiving tool measurements made through one or more measurement units with azimuthal sensitivity of an electromagnetic imager tool operating to log a wellbore in a formation. The instructions can also cause the processor to apply one or more mud effect removal techniques to the tool measurements across a plurality of mud angle estimates to generate mud effect removed quantities for the one or more measurement units across the plurality of mud angle estimates. Further, the instructions can cause the processor to identify a mud angle associated with the electromagnetic imager tool from the plurality of mud angle estimates based on an amount of variation between the mud effect removed quantities across the one or more measurement units for each of the plurality of mud angle estimates.

The one or more measurement units comprise one or more button electrodes or one or more azimuthal bins. The identified mud angle can have a smallest amount of variation between the mud effect removed quantities across the two or more electrodes for the plurality of mud angle estimates. The mud effect removed quantities for the one or more measurement units can be averaged to generate averaged mud effect removed quantities at each of the plurality of mud angle estimates for the one or more measurement units. In turn, the mud angle associated with the electromagnetic imager tool can be identified based on an amount of variation between the averaged mud effect removed quantities across the one or more measurement units for each of the plurality of mud angle estimates. Further, the mud effect removed quantities can be normalized by further averaging the averaged mud effect removed quantities for the one or more measurement units across the plurality of mud angle estimates to generate an overall average mud effect removed measurement value at each of the plurality of mud angle estimates. In turn, the overall average mud effect removed measurement value can be divided by the averaged mud effect removed quantities for the one or more measurement units at each of the plurality of mud angle estimates to generate normalized average mud effect removed quantities at each of the plurality of mud angle estimates for the one or more measurement units. As follows, the mud angle associated with the electromagnetic imager tool can be identified based on an amount of variation between the normalized mud effect removed quantities across the one or more measurement units for each of the plurality of mud angle estimates. The amount of variation between the mud effect removed quantities across the one or more measurement units can be identified based on a standard deviation of the mud effect removed quantities across the one or more measurement units for each of the plurality of mud angle estimates. Additionally, the mud effect removed quantities can be constrained with one or more constraining quantities before identifying the mud angle associated with the electromagnetic imager tool based on the amount of variation between the mud effect removed quantities across the one or more measurement units for each of the plurality of mud angle estimates. The one or more constraining quantities can be set based on either or both a minimum average tool measurement response of average tool measurements responses for the one or more measurement units and one or more measurements made by a reference resistivity tool. Further, the electromagnetic imager tool can be a multi-frequency tool and one or more constraining quantities are set based on one or more measurements made by the multi-frequency electromagnetic imager tool at the higher frequency than at least one of the frequencies employed to log the wellbore.

The plurality of mud angle estimates can be selected from a group of mud angle estimates based on values of the mud effect removed quantities generated from the plurality of mud angle estimates through application of the one or more mud effect removal techniques. Further, the tool measurements can be a subset of a set of tool measurements made by the electromagnetic imager tool, the method further comprising selecting the tool measurements from the set of tool measurements based on strengths of the mud effect in the tool measurements in comparison to strengths of the mud effect in other tool measurements of the set of tool measurements. The tool measurements can be selected from the set of tool measurements based on the strengths of the mud effect in the tool measurements being greater than the strengths of the mud effect in the other tool measurements of the set of tool measurements. A blob detection technique can be applied to the set of tool measurements to select the tool measurements from the set of tool measurements based on the strengths of the mud effect in the tool measurements and the strengths of the mud effect in the other tool measurements of the set of tool measurements. The set of tool measurements can include impedances measured through the two or more electrodes and the tool measurements can be selected from the set of tool measurements based on strengths of the mud effect identified through either or both absolute values or imaginary parts of the impedances of the set of tool measurements including the selected tool measurements. Further, the tool measurements can be selected from the set of tool measurements based on measurements made through an auxiliary tool associated with the electromagnetic imager tool. Additionally, the tool measurements can be selected from the set of tool measurements by applying an edge detection technique to the set of tool measurements including the selected tool measurements. The tool measurements can also be selected from the set of tool measurements based on noise levels in the tool measurements in comparison to noise levels in other tool measurements of the set of tool measurements. The one or more measurement units can be a subset of a set of measurement units configured to make tool measurements, the method further comprising selecting the one or more tool measurements from the set of electrodes based on amounts of variation between average tool measurement responses of each measurement unit in the set of measurement units.

The electromagnetic imager tool can be disposed in the wellbore. In turn, the electromagnetic imager tool can be operated in the wellbore to gather the tool measurements by logging the wellbore.

What is claimed is:

1. A method performed by an electromagnetic imaging system for reducing mud effect while imaging formations surrounding a wellbore, the method comprising:
   receiving, by a processor, a plurality of tool measurements made through one or more measurement units of an electromagnetic imager tool operating to log a wellbore in a formation, wherein the one or more measurement units have azimuthal sensitivity, the plurality of tool measurements including contributions from both mud and formation;

applying, by the processor, one or more mud effect removal techniques to the plurality of tool measurements across a plurality of mud angle estimates to generate a plurality of mud effect removed quantities for the one or more measurement units across the plurality of mud angle estimates;

averaging, by the processor, the plurality of mud effect removed quantities for the one or more measurement units to generate averaged mud effect removed quantities at each of the plurality of mud angle estimates for the one or more measurement units;

identifying, by the processor, a mud angle associated with the electromagnetic imager tool from the plurality of mud angle estimates that minimizes an amount of variation between the averaged mud effect removed quantities across the one or more measurement units; and generating, by the processor, using the identified mud angle, an image of the formation in which the mud effect is removed.

2. The method of claim 1, wherein the one or more measurement units comprise one or more button electrodes or one or more azimuthal bins.

3. The method of claim 1, further comprising:
normalizing the mud effect removed quantities by further averaging the averaged mud effect removed quantities for the one or more measurement units across the plurality of mud angle estimates to generate an overall average mud effect removed measurement value at each of the plurality of mud angle estimates;
dividing the overall average mud effect removed measurement value by the averaged mud effect removed quantities for the one or more measurement units at each of the plurality of mud angle estimates to generate normalized average mud effect removed quantities at each of the plurality of mud angle estimates for the one or more measurement units; and
identifying the mud angle associated with the electromagnetic imager tool that minimizes an amount of variation between the normalized mud effect removed quantities across the one or more measurement units for each of the plurality of mud angle estimates.

4. The method of claim 1, wherein the amount of variation between the mud effect removed quantities across the one or more measurement units is identified based on a standard deviation of the mud effect removed quantities across the one or more measurement units for each of the plurality of mud angle estimates.

5. The method of claim 1, further comprising constraining the mud effect removed quantities with one or more constraining quantities before identifying the mud angle associated with the electromagnetic imager tool based on the amount of variation between the mud effect removed quantities across the one or more measurement units for each of the plurality of mud angle estimates.

6. The method of claim 5, wherein the one or more constraining quantities are set based on either or both a minimum average tool measurement response of average tool measurements responses for the one or more measurement units and one or more measurements made by a reference resistivity tool.

7. The method of claim 5, wherein the electromagnetic imager tool is a multi-frequency tool and the one or more constraining quantities are set based on one or more measurements made by the multi-frequency electromagnetic imager tool at the higher frequency than at least one of the frequencies employed to log the wellbore.

8. The method of claim 1, wherein the plurality of mud angle estimates are selected from a group of mud angle estimates based on values of the mud effect removed quantities generated from the plurality of mud angle estimates through application of the one or more mud effect removal techniques.

9. The method of claim 1, wherein the tool measurements are a subset of a set of tool measurements made by the electromagnetic imager tool, the method further comprising selecting the tool measurements from the set of tool measurements based on strengths of the mud effect in the tool measurements in comparison to strengths of the mud effect in other tool measurements of the set of tool measurements.

10. The method of claim 9, wherein the tool measurements are selected from the set of tool measurements based on the strengths of the mud effect in the tool measurements being greater than the strengths of the mud effect in the other tool measurements of the set of tool measurements.

11. The method of claim 9, further comprising either or both applying a blob detection technique to the set of tool measurements to select the tool measurements from the set of tool measurements based on the strengths of the mud effect in the tool measurements and the strengths of the mud effect in the other tool measurements of the set of tool measurements and applying an edge detection technique to the set of tool measurements to select the tool measurements from the set of tool measurements.

12. The method of claim 9, wherein the set of tool measurements include impedances measured through two or more electrodes and the tool measurements are selected from the set of tool measurements based on strengths of the mud effect identified through either or both absolute values or imaginary parts of the impedances of the set of tool measurements including the selected tool measurements.

13. The method of claim 9, wherein the tool measurements are selected from the set of tool measurements based on measurements made through an auxiliary tool associated with the electromagnetic imager tool.

14. The method of claim 1, wherein the tool measurements are a subset of a set of tool measurements made by the electromagnetic imager tool, the method further comprising selecting the tool measurements from the set of tool measurements based on either or both noise levels in the tool measurements in comparison to noise levels in other tool measurements of the set of tool measurements and amounts of variation between average tool measurement responses of each measurement unit in the set of measurement units.

15. The method of claim 1, further comprising:
disposing the electromagnetic imager tool in the wellbore; and
operating the electromagnetic imager tool in the wellbore to gather the tool measurements by logging the wellbore.

16. An electromagnetic imaging system for reducing mud effect while imaging formations surrounding a wellbore, the system comprising:
an electromagnetic imager tool having one or more measurement units that have azimuthal sensitivity;
one or more processors; and
at least one computer-readable storage medium having stored therein instructions which, when executed by the one or more processors, cause the one or more processors to perform operations comprising:

receiving a plurality of tool measurements made through the one or more measurement units while the electromagnetic imager tool is operating to log a wellbore in a formation, the plurality of tool measurements including contributions from both mud and formation;

applying one or more mud effect removal techniques to the plurality of tool measurements across a plurality of mud angle estimates to generate a plurality of mud effect removed quantities for the one or more measurement units across the plurality of mud angle estimates;

averaging the plurality of mud effect removed quantities for the one or more measurement units to generate averaged mud effect removed quantities at each of the plurality of mud angle estimates for the one or more measurement units;

identifying a mud angle associated with the electromagnetic imager tool from the plurality of mud angle estimates that minimizes based on an amount of variation between the averaged mud effect removed quantities across the one or more measurement units; and generating, using the identified mud angle, an image of the formation in which the mud effect is removed.

17. The electromagnetic imaging system of claim 16, wherein the electromagnetic imager tool is configured to gather the measurements by logging the wellbore when the electromagnetic imager tool is disposed in the wellbore.

18. A non-transitory computer-readable storage medium having stored therein instructions which, when executed by a processor of an electromagnetic imaging system, cause the processor to perform operations for reducing mud effect while imaging formations surrounding a wellbore, the operations comprising:

receiving a plurality of tool measurements made through one or more measurement units of an electromagnetic imager tool operating to log a wellbore in a formation, wherein the one or more measurement units have azimuthal sensitivity, the plurality of tool measurements including contributions from both mud and formation;

applying one or more mud effect removal techniques to the plurality of tool measurements across a plurality of mud angle estimates to generate a plurality of mud effect removed quantities for the one or more measurement units across the plurality of mud angle estimates;

averaging the plurality of mud effect removed quantities for the one or more measurement units to generate averaged mud effect removed quantities at each of the plurality of mud angle estimates for the one or more measurement units;

identifying a mud angle associated with the electromagnetic imager tool from the plurality of mud angle estimates that minimizes an amount of variation between the averaged mud effect removed quantities across the one or more measurement units; and generating, using the identified mud angle, an image of the formation in which the mud effect is removed.

* * * * *